(12) United States Patent
Manolis et al.

(10) Patent No.: US 7,243,079 B1
(45) Date of Patent: Jul. 10, 2007

(54) USER INTERFACE AND METHODS FOR ONLINE PRINT SERVICE

(75) Inventors: Eva Manolis, Menlo Park, CA (US); Chase Garfinkle, Redwood City, CA (US); Hwei Mien Quek, Cupertino, CA (US); Su Mien Quek, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 1499 days.

(21) Appl. No.: 09/721,484

(22) Filed: Nov. 22, 2000

Related U.S. Application Data

(60) Provisional application No. 60/170,371, filed on Dec. 13, 1999, provisional application No. 60/167,675, filed on Nov. 29, 1999, provisional application No. 60/167,243, filed on Nov. 24, 1999.

(51) Int. Cl.
G06F 17/30 (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS 5,359,387 A * 10/1994 Hicks ........................... 355/40
6,263,317 B1 * 7/2001 Sharp et al. .................. 705/26
6,321,211 B1 * 11/2001 Dodd ............................ 705/26
6,629,079 B1 * 9/2003 Spiegel et al. ............... 705/26
6,873,971 B1 * 3/2005 Tackbary et al. ............. 705/27

FOREIGN PATENT DOCUMENTS

JP 410124492 A * 5/1998

OTHER PUBLICATIONS

Ojeda-Zapata, Julio, "Digital cameras used to be gee-whiz gismos with one glaring", The Charleston Gazette, Dated Feb. 20, 2000.*

* cited by examiner

Primary Examiner—Mark Fadok
(74) Attorney, Agent, or Firm—Bao Tran; Xin Wen

(57) ABSTRACT

A user interface, methods and tools for manipulating, displaying and ordering image prints from an on-line print service. One user interface includes a personalized account summary including an image selected from the user's archives. Another user interface includes a first field including an image to be printed and a second field including a text box for specifying a message to be printed on the image print. Another user interface includes a drop spot, the drop spot being a designated portion of the user interface on to which a user selection can be dragged and dropped where the drop spot has an associated code portion operable to process the user selection dropped on the drop spot. Methods include methods for designating multiple recipients for an image to be distributed using an on-line print service and methods for updating a user's address book during an order method for designating multiple recipients for an image at an on-line print service.

34 Claims, 35 Drawing Sheets

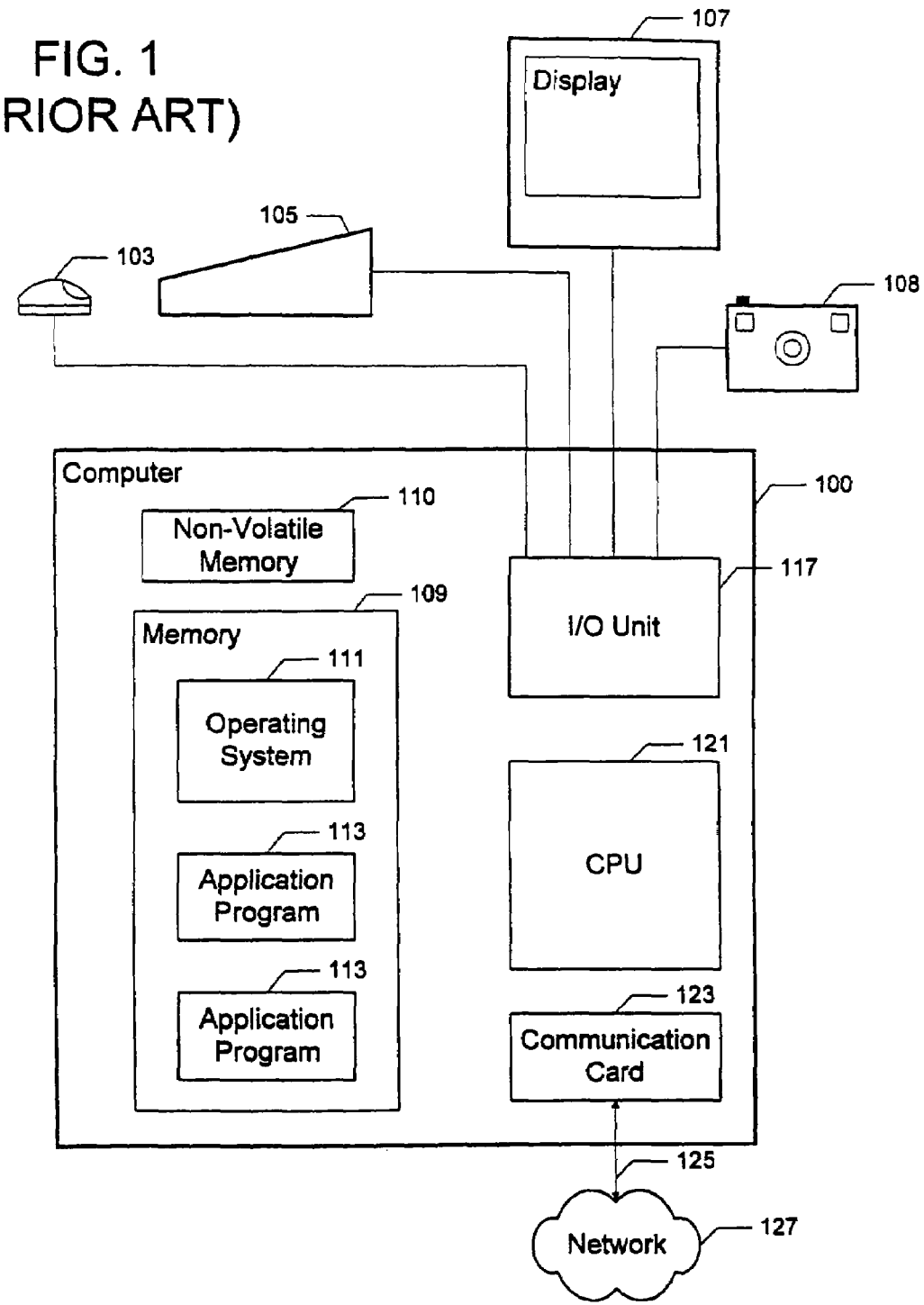

Subj: Your Shutterfly Order #19697250-9000024 is confirmed
Date: 12/10/99 2:48:48 PM Eastern Standard Time
From: orders@shutterfly.com
To: patentlawyer@aol.com Thank you for ordering prints from Shutterfly!

Your order information appears below. We will notify you by email when your order has shipped.

------------------------------------------------
Order Total       $ 22.94
------------------------------------------------

To: J. Christopher Phillips
    3420 21st Avenue North
    Arlington, VA 22207

2  8x10 Prints        $ 9.98
    Shipping (USPS1)  $ 1.49
    Tax              $ 0.00
                        ---------
    Total           $ 11.47

------------------------------------------------

To: Richard Phillips
    1291 Lejano Lane
    Santa Fe, NM 87501

2  8x10 Prints        $ 9.98
    Shipping (USPS1)  $ 1.49
    Tax              $ 0.00
                        ---------
    Total           $ 11.47

------------------------------------------------

If you need to get in touch with us about your order, send an e-mail message to orders@shutterfly.com (or just reply to this message).

Thank you for using Shutterfly.com!

FIG. 22

USER INTERFACE AND METHODS FOR ONLINE PRINT SERVICE

This application claims priority to U.S. patent application 60/170,371, filed Dec. 13, 1999; and to U.S. patent application 60/167,675, filed Nov. 29, 1999; and to U.S. patent application 60/167,243, filed Nov. 24, 1999.

TECHNICAL FIELD

This application relates to a user interface for an online print service.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 (e.g., a telephone line).

The computer 100 of FIG. 1 also can be connected to various peripheral I/O devices. One of the more popular of such peripheral devices is a digital camera 108 that enables users to take pictures and save them in digital (electronic) format. Typically, the digital camera 108 is connected to the computer 100 only while the user is uploading images to the computer's disk drive or other non-volatile memory 110. Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

In any event, once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies (physical prints) made of digital images. Such hard copies can be generated locally by the user using output devices such an inkjet printer or a dye sublimation printer. In addition, users can transmit digital images (e.g., either over a computer network or by using a physical storage medium such as a floppy disk) to a photo-finishing service, which can make hard copies of the digital images and send them (e.g., by U.S. Mail or courier service) back to the user.

FIGS. 2A-2F show a sequence of screen shots that a user might encounter when transmitting digital images to a photo-finishing service to have hard copies (prints) made of the images. In FIG. 2A, the user first encounters a contact information window 200 in which the user must enter several items of contact information such as first and last names 202, 204, address 206, city 208, state 210, country 210, phone 214, fax 216, and Email address 218. This information typically is required by the photo-finishing service for purposes of billing and shipping.

After the user has entered the required information, the user presses the Next button 220 to arrive at the next screen—an image selection window 222 as shown in FIGS. 2B and 2C. In the image selection window 222, the user designates the specific images of which hard copies are to be made. The digital images either can be selected from among the images stored on the user's computer by clicking the "Select Image . . . " button 230 or they can be acquired from a digital camera or scanner attached to the user's computer by clicking the "Acquire Image . . . " button 232. Once selected, the images can be viewed and/or cropped by clicking on the "View/Crop" button 234. In addition, the user can designate the hard copy format and other parameters (e.g., size, number of copies, paper type) for each of the selected images by selecting or entering the desired options using drop-down list 224 and text box 226. The selected images and their associated parameters are shown in display area 228. Typically, each order for prints must meet a minimum order amount 223 (e.g., five dollars).

After the images and their respective hard copy parameters have been selected, the user clicks the Next button 236 and a shipping and payment information window 238 is presented. In this window 238, the user selects a desired shipping method from drop-down list 240 and specifies a method of payment and associated verification information in text boxes 242, 244, 246 and 248.

After this information has been provided, the user clicks the Next button 250 and is presented with an order confirmation window as shown in FIG. 2E. The order verification window 250 allows the user to view and confirm the order including the images selected and their respective parameters in display area 252, as well as the price of the order 254. If the user is satisfied with the order, the user clicks the Finish button 256 to complete the order.

Upon completing the order, the images are uploaded to the photo-finishing service as indicated by the upload window 258 in FIG. 2F. Once the images are uploaded, the photo-finishing service arranges to have prints made of the selected images and to have the prints mailed to the user and address specified in the contact information window 200. If the user desires to have prints of the same (or different) images sent to another person (e.g., a family member or friend), the user typically must repeat the entire order generating process represented by FIGS. 2A-2F. Generally, repeating the ordering process to send prints to another person involves entering a considerable amount of redundant information and incurring separate charges, including multiple minimum order charges, on the user's credit card (or other financial instrument).

SUMMARY

A user interface, methods and tools for manipulating, displaying and ordering image prints from an on-line print service. One user interface includes a personalized account summary including an image selected from the user's archives. Another user interface includes a first field including an image to be printed and a second field including a text box for specifying a message to be printed on the image print. Another user interface includes a drop spot, the drop spot being a designated portion of the user interface on to which a user selection can be dragged and dropped where the drop spot has an associated code portion operable to process the user selection dropped on the drop spot. Methods include methods for designating multiple recipients for an image to be distributed using an on-line print service and methods for updating a user's address book during an order method for designating multiple recipients for an image at an on-line print service.

DRAWING DESCRIPTIONS

FIG. 1 is a block diagram showing a typical computer architecture.

FIG. 22 shows an example of an order confirmation e-mail message.

DETAILED DESCRIPTION

The details of one or more embodiments are set forth in the accompanying drawings and in the description below.

Other features, objects, and advantages will become apparent from the description and drawings.

Figure 2A:
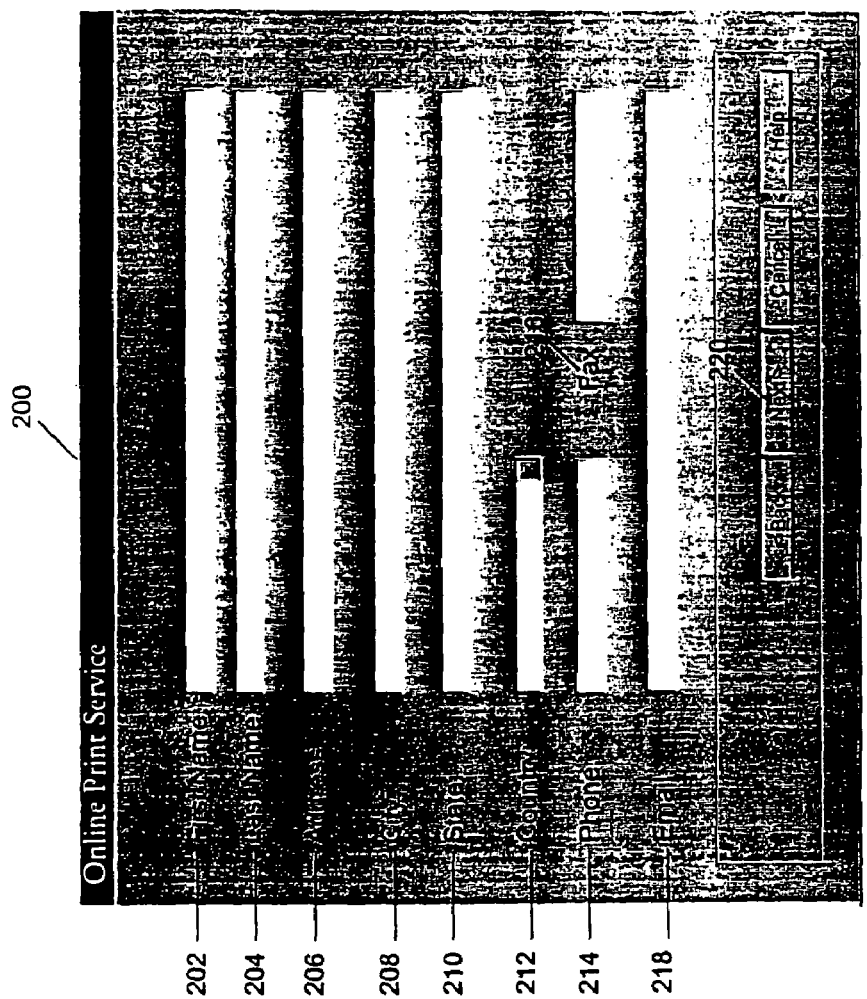
FIGS. 2A-2F show a series of typical display windows that a user might encounter when ordering image prints online.
Figure 2B:
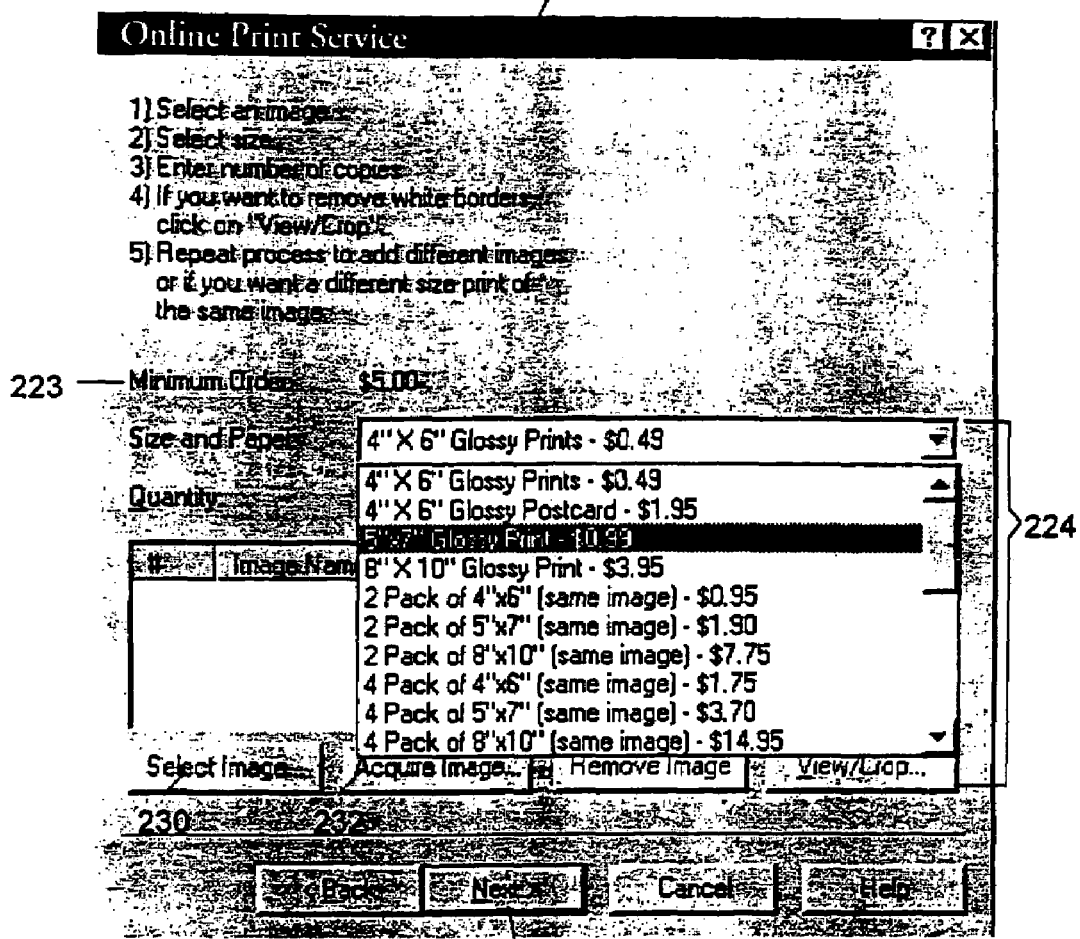
Figure 2C:
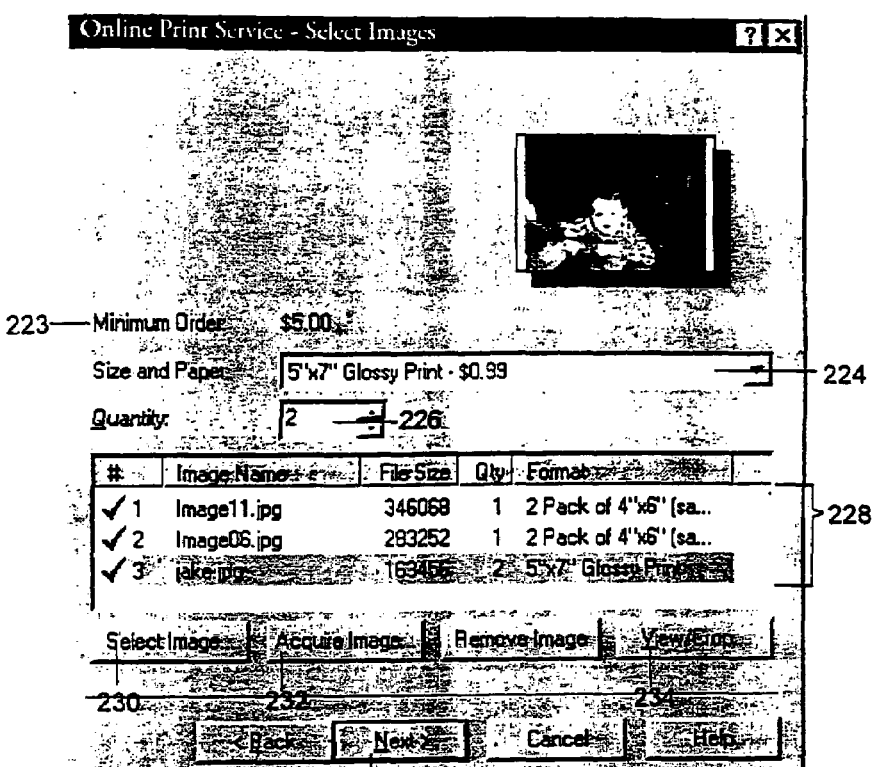
Figure 2D:
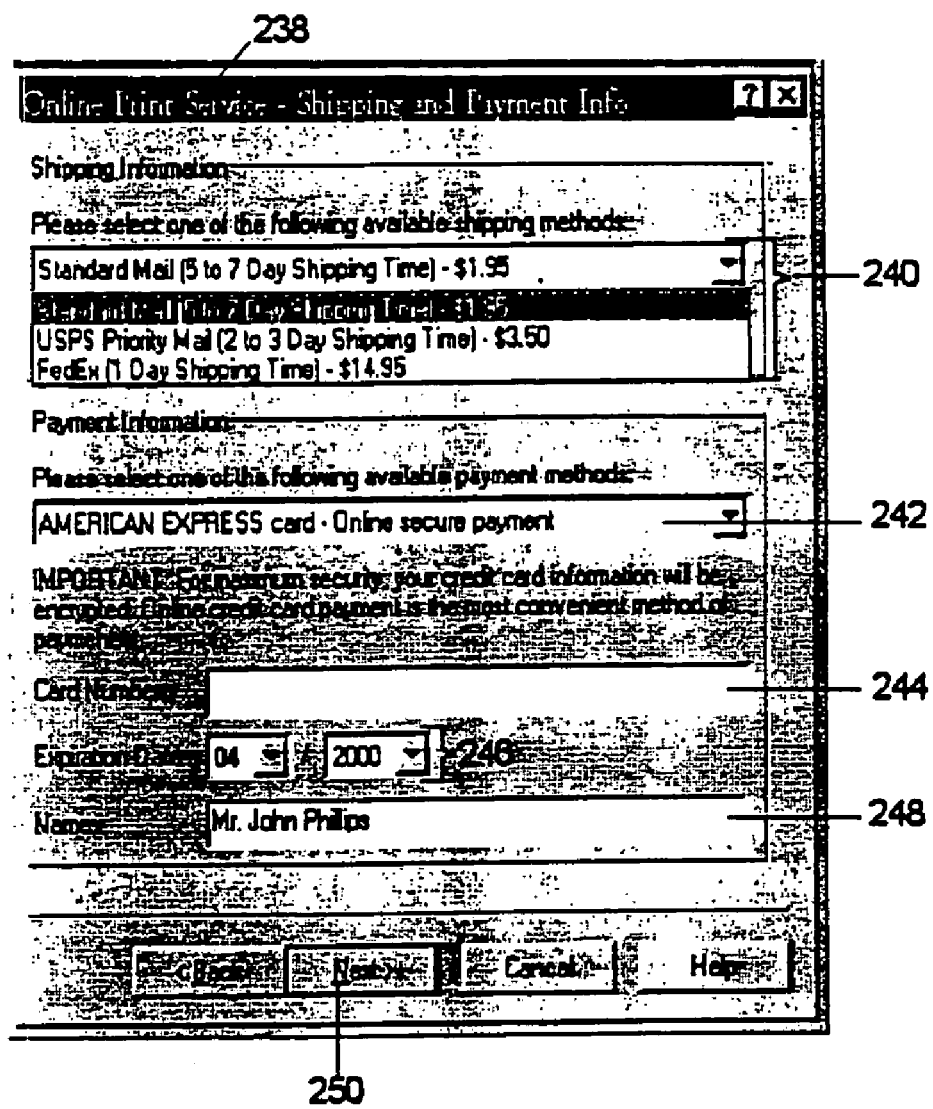
Figure 2E:
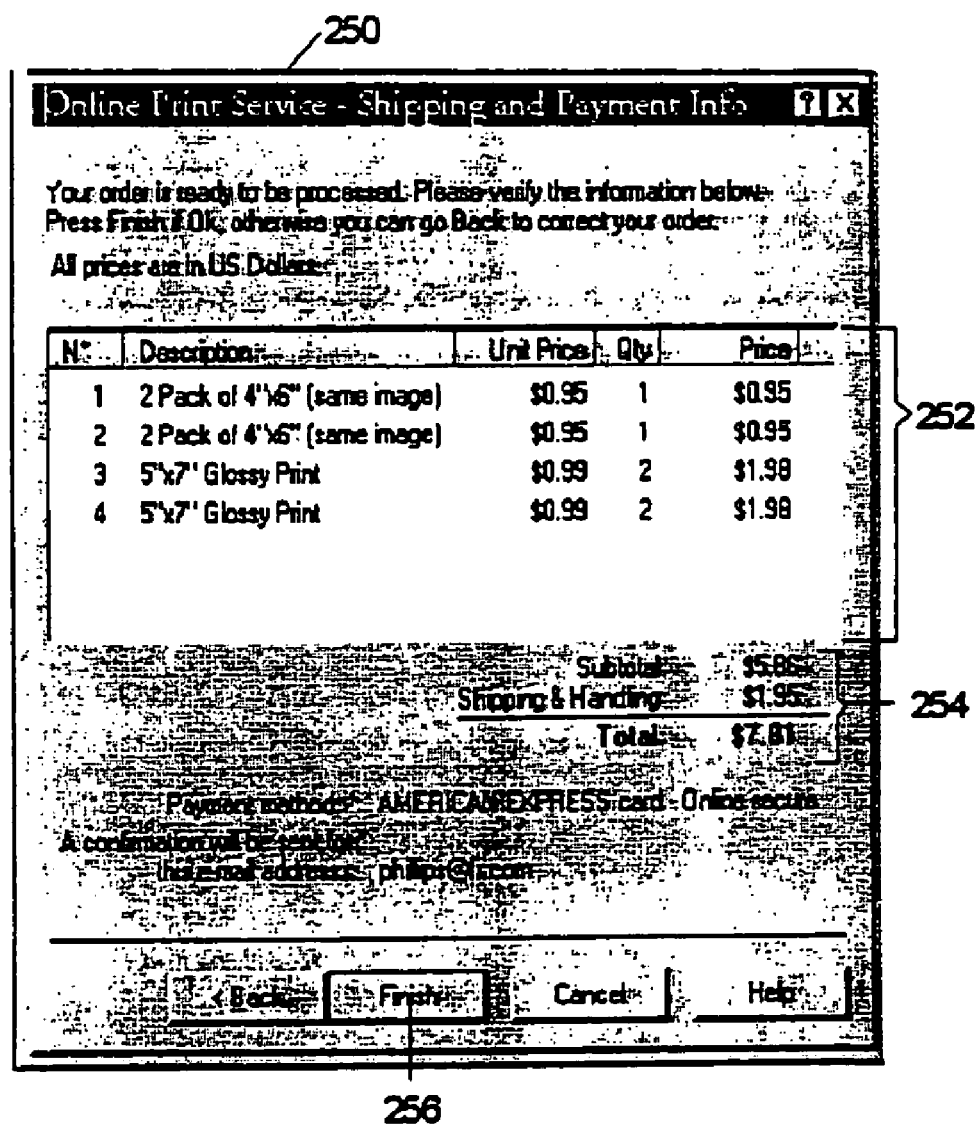
Figure 2F:
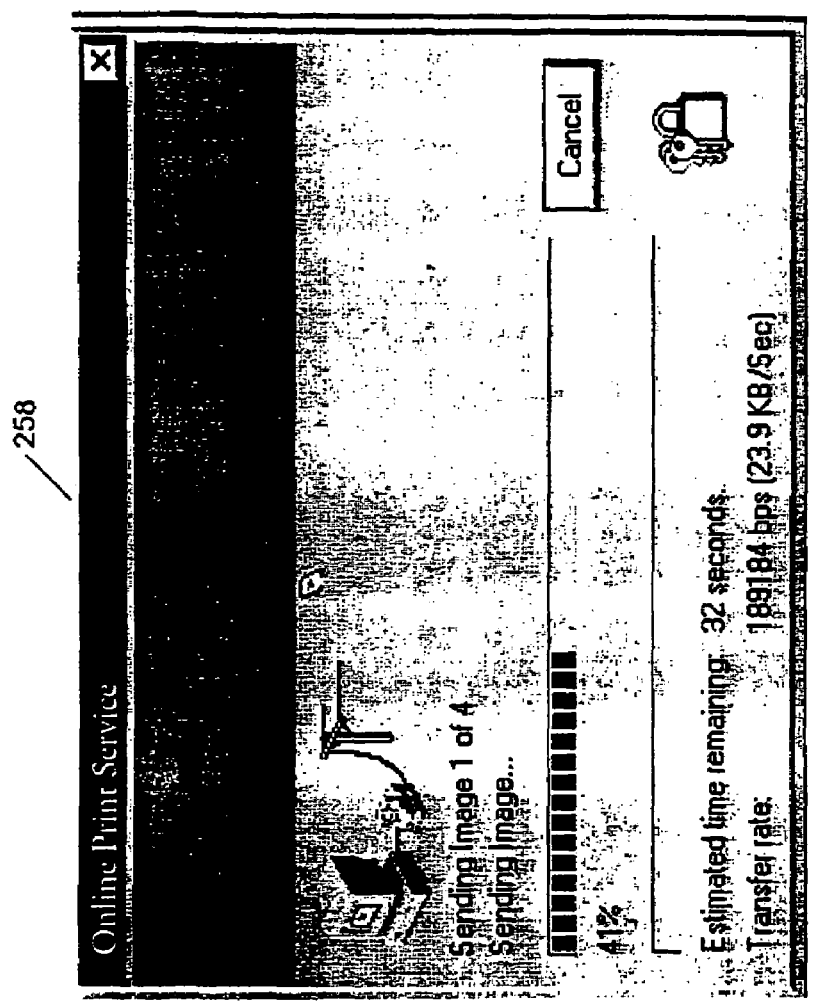
Figure 3:
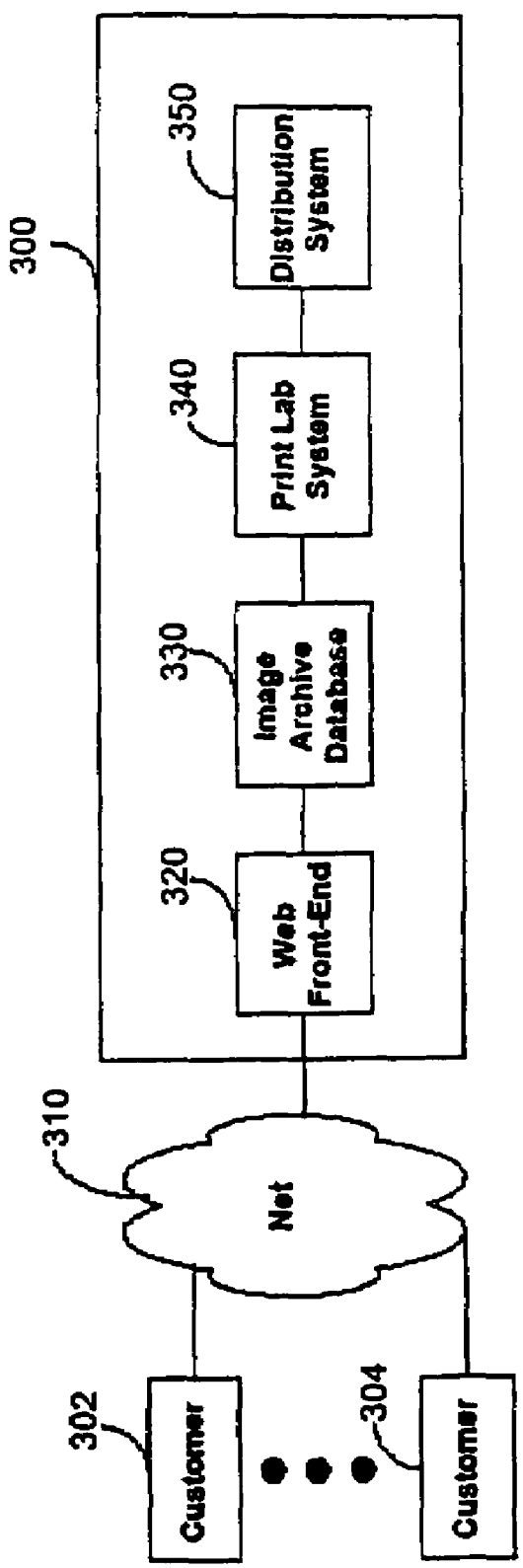
FIG. 3 is a block diagram of a system for making and distributing image prints.

FIG. 3 is a block diagram of one deployment of a print generation and distribution system 300. In general, the system of FIG. 3 enables users to transmit images to a photo-finisher and then order prints of those images to be sent to one or more recipients. In FIG. 3, one or more customers 302-304 communicate with the system 300 over a wide area network 310 such as the Internet. In one embodiment, the system 300 stores digital images that have been submitted by the customers 302-304 over the Internet for subsequent printing and delivery to designated recipients.

The system 300 has a web front-end computer system 320 that is connected to the network 310. The web front-end computer system 320 receives customer input or requests from the network 310 and communicates the received information to an image archive database 330. The image archive database 330 captures images submitted by the customers 302-304 and archives these images for rapid retrieval when needed. The information stored in the image archive database 330 in turn is provided to a print laboratory system 340 for generating high resolution, high quality photographic prints. The output from the print lab system 340 in turn is provided to a distribution system 350 that delivers the physical prints to the customers 302-304 and/or to their respective designated recipients.

Although the print lab system 340 and the distribution system 350 are represented as separate boxes in FIG. 3A, in various implementations they can be integrated in whole or in part. For example, the print lab system 340 can be designed to generate prints in a manner and/or in an order that readily facilitates physical shipment of the prints to their respective ultimate destinations. (As used herein, "destination" is used to include a shipping address, for example, a post office address for an enterprise or an individual, and/or a name of a specific individual or group of individuals residing at a given shipping address.) In one implementation, a single print order received at the web front-end 320 could be divided into sub-orders, each of which corresponds to a set of prints to be generated and delivered to a separate destination address and/or intended recipient. Then, for each order, the print lab system 340 could create multiple instances of digital images and rearrange them as needed to build the constituent sub-orders. Each sub-order then is sent to the printing system to generate a separate run of prints for the recipient associated with the sub-order under consideration. Further details on the print generation and distribution system are provided in co-pending U.S. patent application Ser. No. 09/428,871, filed Oct. 27, 1999; Ser. No. 09/436,704, filed Nov. 9, 1999; Ser. No. 09/450,347, filed Nov. 29, 1999; Ser. No. 09/450,899, filed Nov. 29, 1999; and Ser. No. 09/450,075, filed Nov. 29, 1999, which are incorporated by reference.

FIGS. 4-30 show various aspects and features of a user interface that could be used to allow users to communicate with the web front-end computer system 320 of FIG. 3. In general, the types of information that a user would communicate to the web front-end system include image uploads, billing, shipping and ordering information, and other input as appropriate to help the user organize or manage the user's online photos or, optionally, share them with other users of the web front-end computer.

Figure 4:
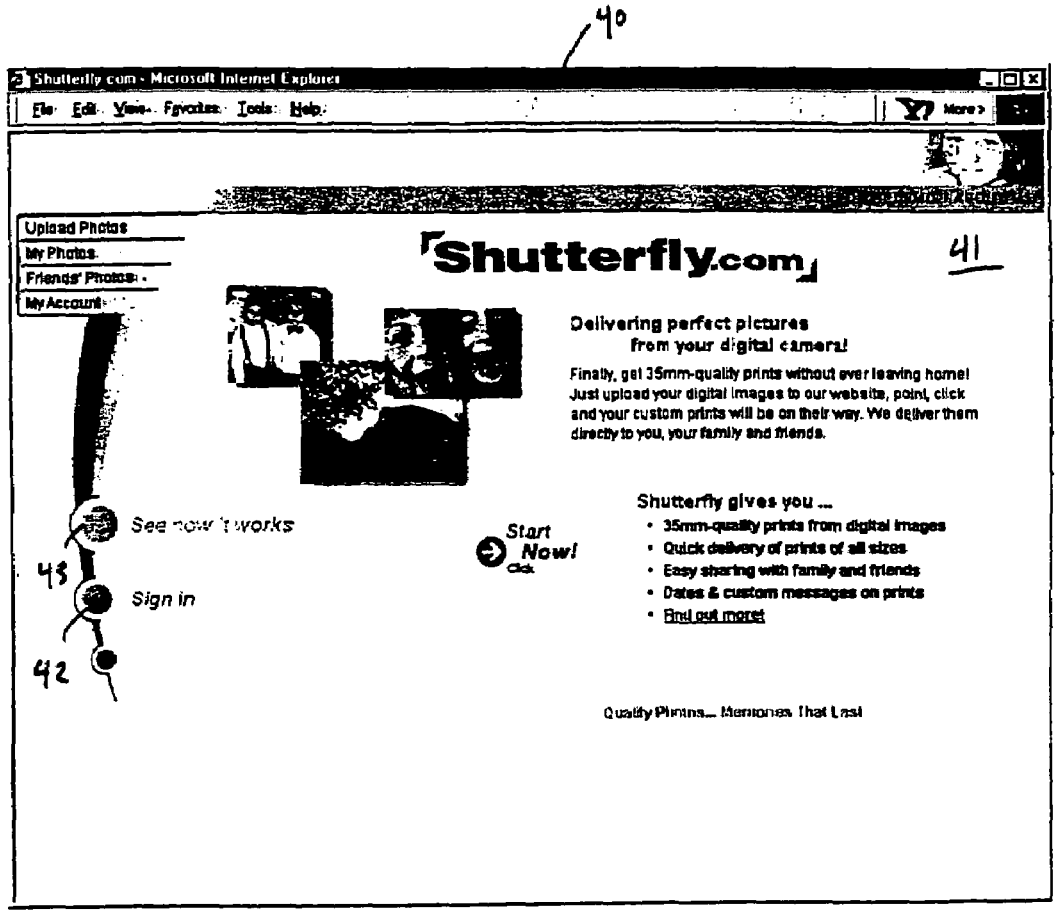
FIG. 4 is a screenshot showing an example of a general home page for an online print service.

As shown in FIG. 4, a user can access an online print service (e.g., Shutterfly.com, Inc. of Mt. View, Calif.) using a browser application such as Microsoft Internet Explorer which runs on the user's client computer system (not shown)

such as a PC or Apple Macintosh. The browser application can display web pages (typically generated using Hypertext Markup Language (HTML)) in a window 40. Typically, the web pages are stored on one or more host computers (e.g., maintained by on behalf of the online print service) and can be accessed by the user via a computer network such as the Internet. The user is greeted with a general Home page 41 providing links to allow a user to Sign In 42 or to see a demonstration of how the print service works 43.

Figure 5:
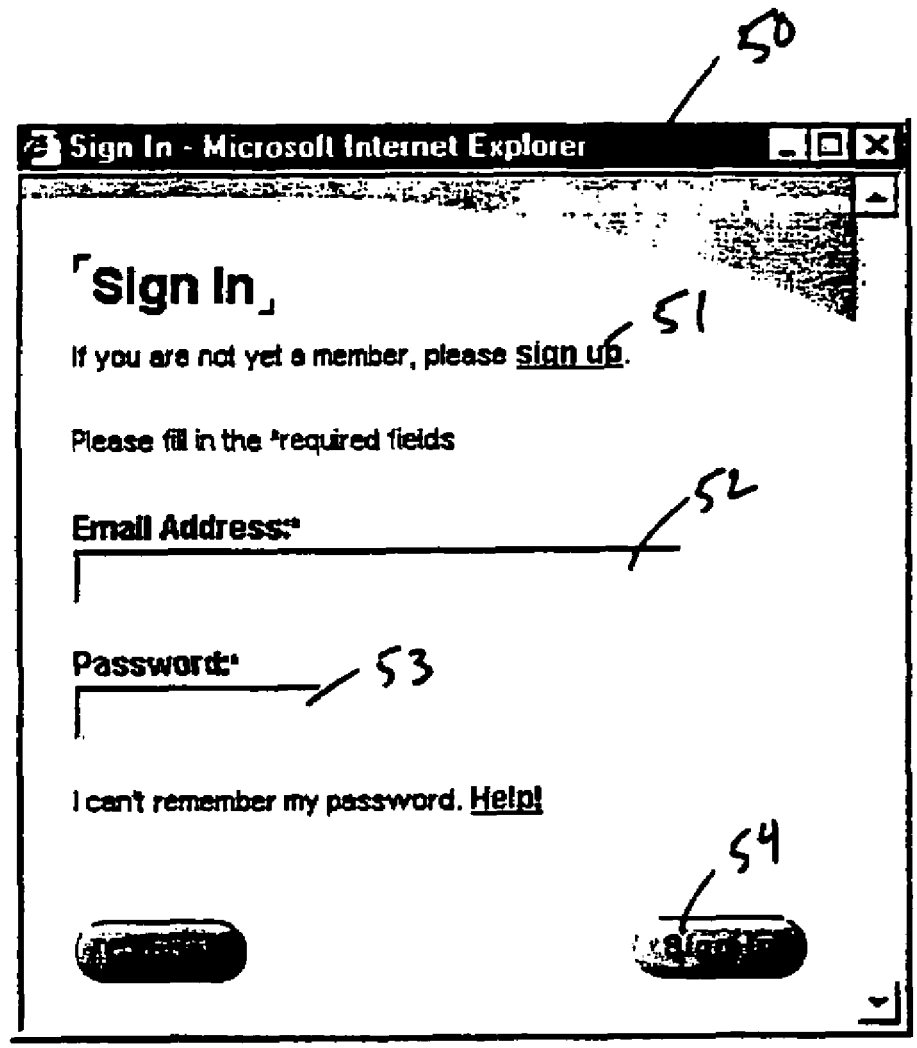
FIG. 5 is a screenshot showing an example of a Sign In window.

When the user clicks the Sign In link 42, the Sign In window 50 is displayed as shown in FIG. 5. The Sign In window 50 enables the user to Sign In to the print service by typing an appropriate Email Address and Password into text fields 52 and 53, respectively, and then clicking the Sign In button 54. If the user has not previously signed up for the service, the user clicks sign up link 51 which takes the user to a Sign Up page (not shown) at which the user's personal information (e.g., name, address, billing and shipping information, etc.).

Figure 6:
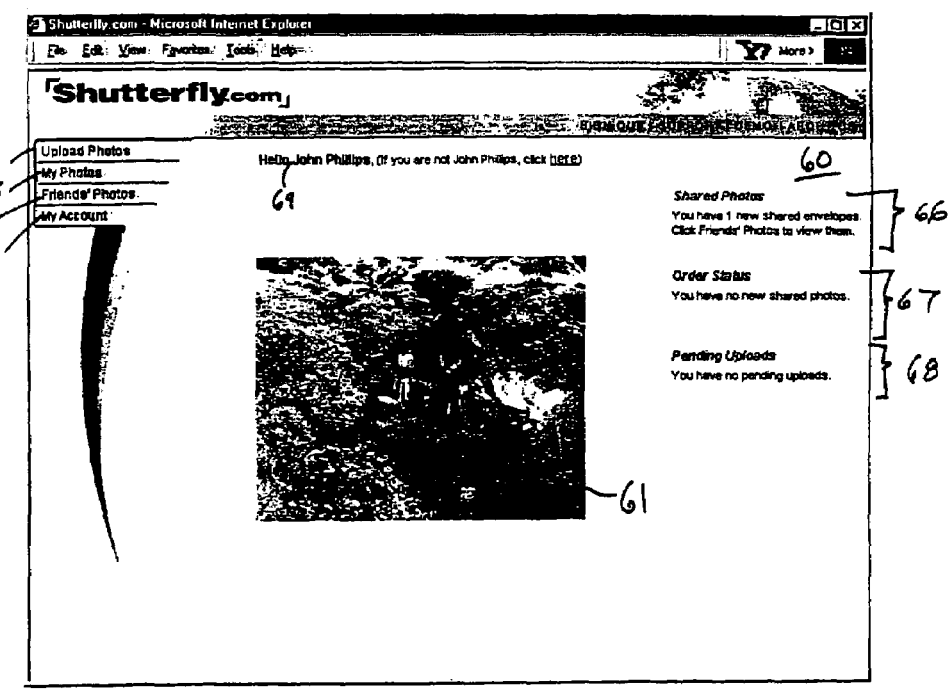
FIG. 6 is a screenshot showing an example of a user's Home page.

After signing in, the user is presented with the user's personal home page 60 as shown in FIG. 6. The user's home page 60 includes several elements including a greeting message 69, one of the user's previously uploaded images (e.g., selected at random from among all of the user's images), and tabs 62-65 which act as links to pages that enable the user to Upload Photos 62, view previously uploaded photos 63, view others' photos 64, and view details of the user's account 65. The user's home page 60 also provides information about the user's available Shared Photos 66, Order Status 67, and Pending Uploads 68. In this example, the user has no pending uploads as indicated in region 68. However, if the user had a pending upload (e.g., either not yet initiated or initiated but since interrupted by a communication failure or the like), the user would be presented with a button (not shown) that, when clicked, would enable the user either to initiate or resume the upload, depending on the circumstances.

Figure 7:
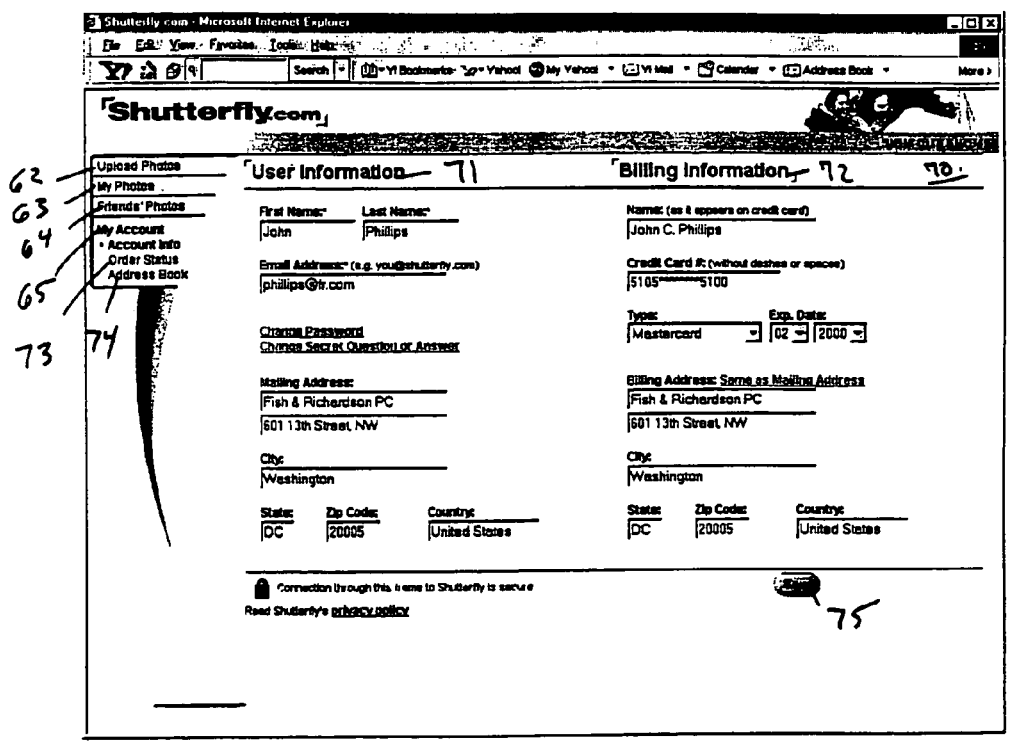
FIG. 7 is a screenshot showing an example of a user's account information page.

FIG. 7 shows the user's account information page 70, which is displayed when the user clicks tab 65 in FIG. 6. The account information page 70 includes various text fields into which the user enters (and/or updates) the user's personal information 71 (name, e-mail address, residential address, etc.) and Billing Information 72 (e.g., credit card type and number, billing address, etc.). After entering or updating the account information, the user can click the Save button 75 to save the new account information on the print service's host computer system. The account information page 70 also includes links to allow the user to check the status of previous orders 73 and to view or edit the user's Address Book 74.

Figure 8:
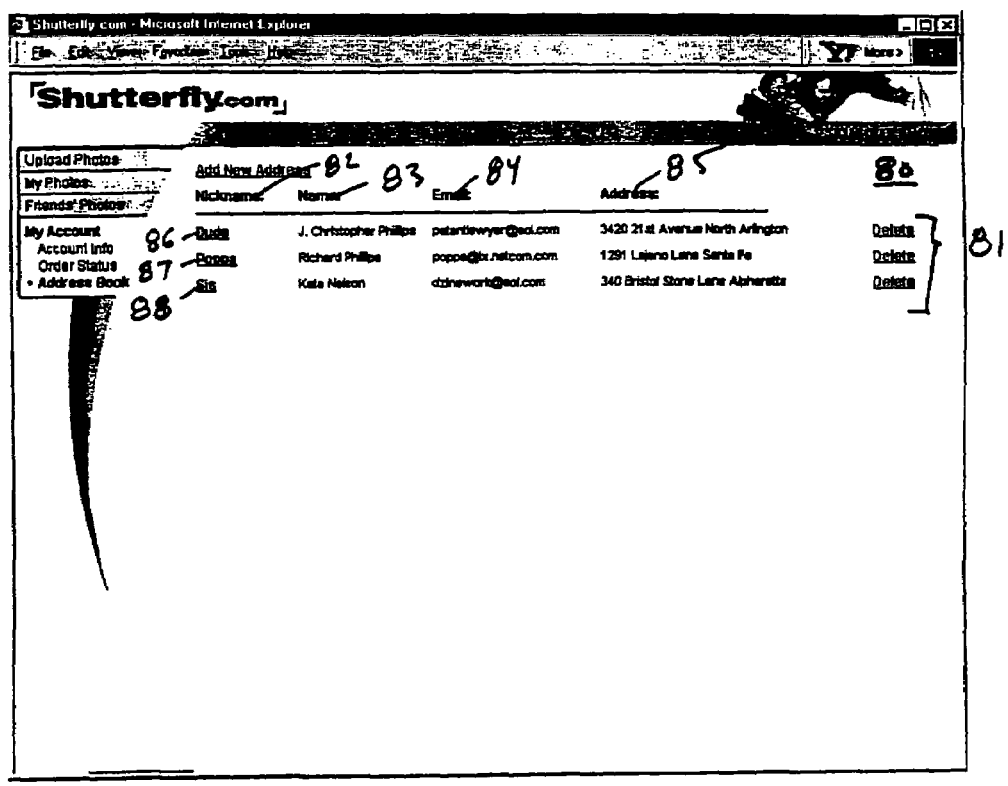
FIG. 8 is a screenshot showing an example of a user's address book.

FIG. 8 shows the user's Address Book page 80 which, in this example, includes three entries 81. Each entry 81 corresponds to a different potential recipient for print copies and/or for sharing online photos. An entry 81 is formed of multiple data elements such as the potential recipient's Nickname 82, Name 83, Email address 84, and residential Address 85. Each entry's data elements can be inspected and/or modified by clicking on the corresponding link 86, 87, or 88 associated with the entry's Nickname 82.

Figure 9:
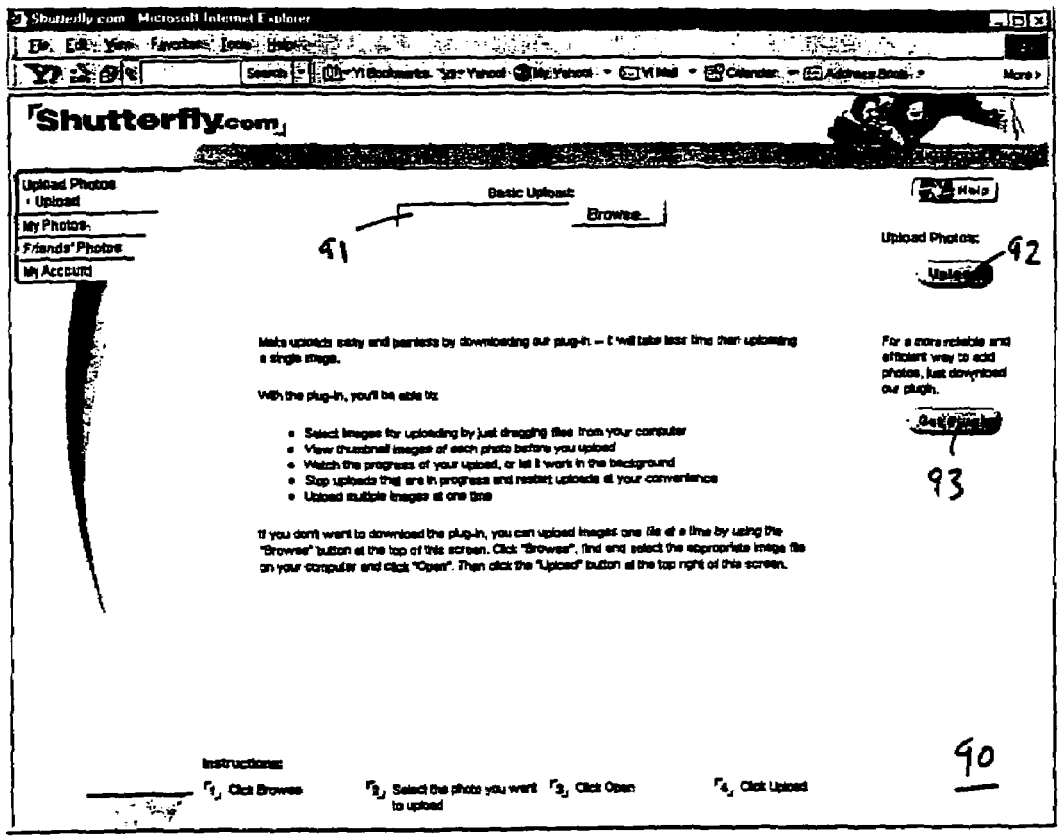
FIGS. 9-11 are screenshots showing examples of image upload pages.

FIG. 9 shows a single image upload page 90 that enables users to upload images, for example, from the user's client computer to the online print service's host computer system. The user designates an image for uploading by entering the image file name (e.g., including a complete filename path such as "c:\images\PIC0001.jpg") into the text field 91, and then clicking the Upload button 92. Optionally, the user can download a plugin—a piece of executable code that, when installed, modifies the browser's operation, for example, to allow the browser to manage non-native date types or to provide enhanced functionality—by clicking the Get Plugin button 93. The plugin in this example is a download plugin that enhances the browser's functionality to support drag-and-drop uploading of multiple images.

Figure 10:
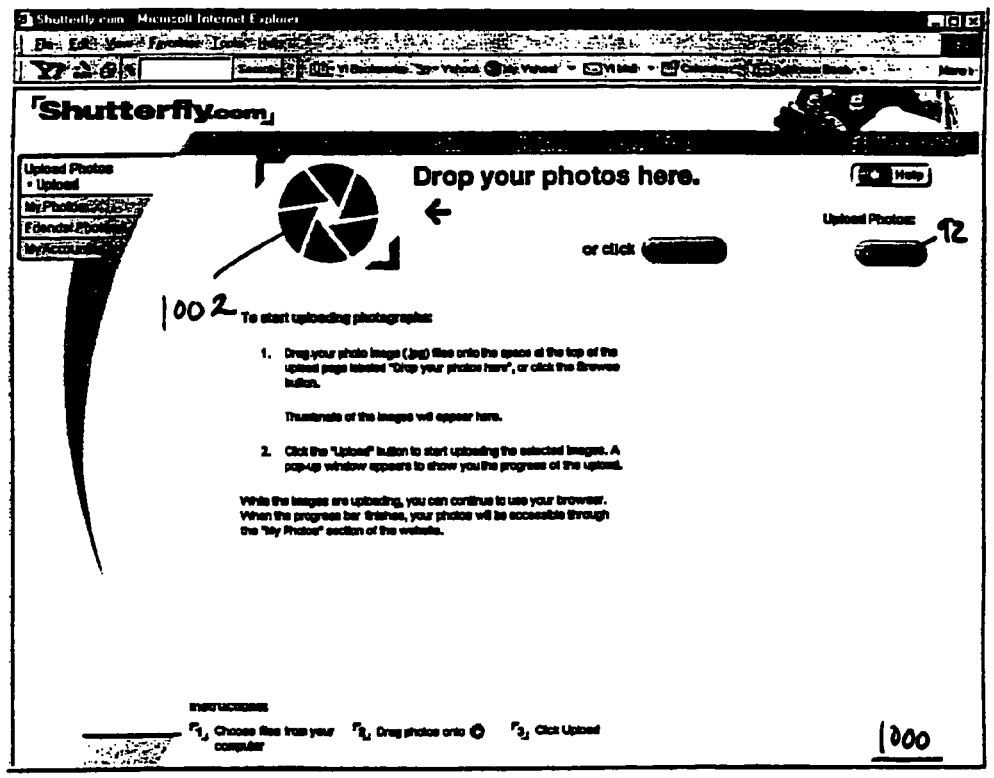

FIG. 10 shows the Upload page 1000 as it appears to the user after downloading and installing the download plugin. As shown, this Upload page 1000 includes a drop spot 1002 onto which a user can drag-and-drop one or more image files to designate them for uploading.

Figure 11:
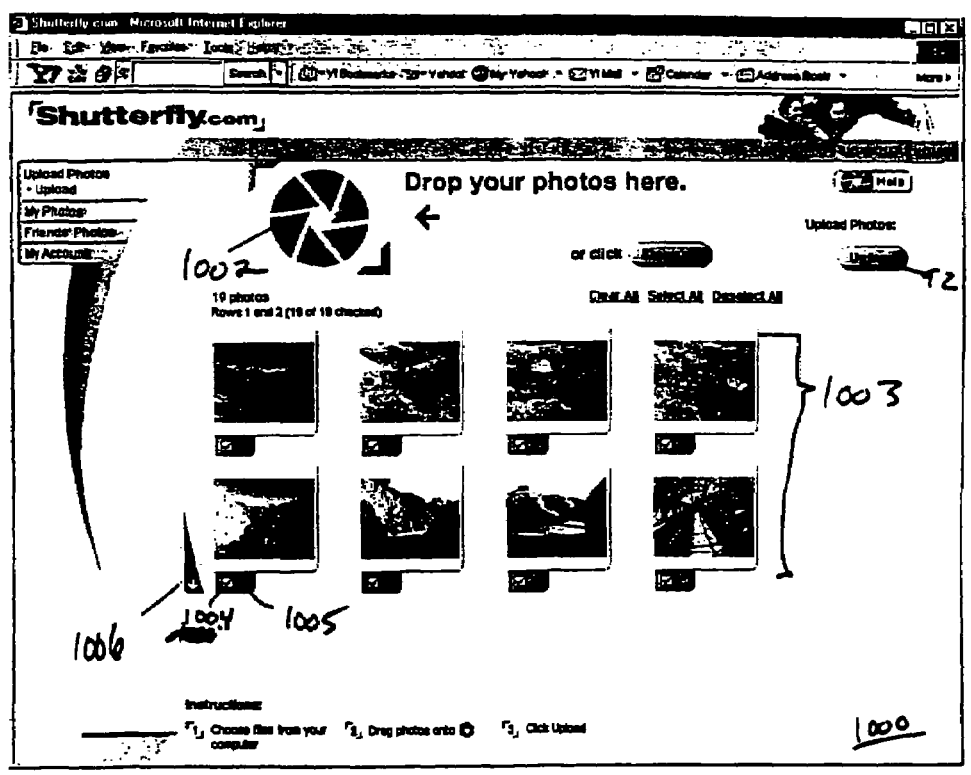

FIG. 11 shows the Upload page 1000 as it appears after the user has dragged-and-dropped image files onto the drop spot 1002. As shown, the plugin automatically creates and displays an image thumbnail 1003 for each of the image files dropped onto the drop spot 1002. In this implementation, up to eight thumbnails are displayed on a single page. If the user has uploaded more than eight images, the user can view and/or access the corresponding thumbnails not currently visible by clicking a scrolling control indicated by a downward arrow 1006 or an upward arrow (not shown).

Each thumbnail has an associated a rotate control 1005, which, for each time clicked, causes the displayed thumbnail to rotate clockwise by 90 degrees. Clicking the rotate control 1005 to change the orientation of the thumbnail also indicates that the corresponding image file should be similarly rotated. Consequently, upon uploading the image file, the host computer system is able to determine the correct (or desired) orientation for that image file.

Each thumbnail also has an associated checkbox 1004. Clicking a checkbox 1004 (or, equivalently, clicking the corresponding thumbnail) causes a checkmark to appear in the checkbox 1004 thereby indicating that the user has designated the corresponding image for upload to the host computer system upon clicking the upload button 92. An unchecked checkbox 1004 indicates that the corresponding image file is not to be uploaded to the host computer system upon clicking the Upload button 92. In this manner, the user can selectively check or uncheck checkboxes 1004 as desired to specify whether or not the corresponding image files are to be uploaded.

Initially, the image thumbnails 1003 are created locally on the user's client computer and displayed as if they are part of the web page 1000 received from the print service's host computer. When the user then clicks Upload button 92, an upload sequence is initiated to upload the thumbnails 1003 and their corresponding image files. The thumbnails 1003 are uploaded before the image files so that the thumbnails will be available at the host computer system (e.g., for purposes of viewing, ordering corresponding prints and/or sharing images with other users) without having to wait for the (potentially time-consuming) image file upload to complete. Further details on uploading thumbnails and image files are provided in U.S. patent application Ser. No. 09/450,804, filed Nov. 29, 1999, and Ser. No. 09/450,927, filed Nov. 29, 1999, both of which are incorporated herein by reference.

Figure 12:
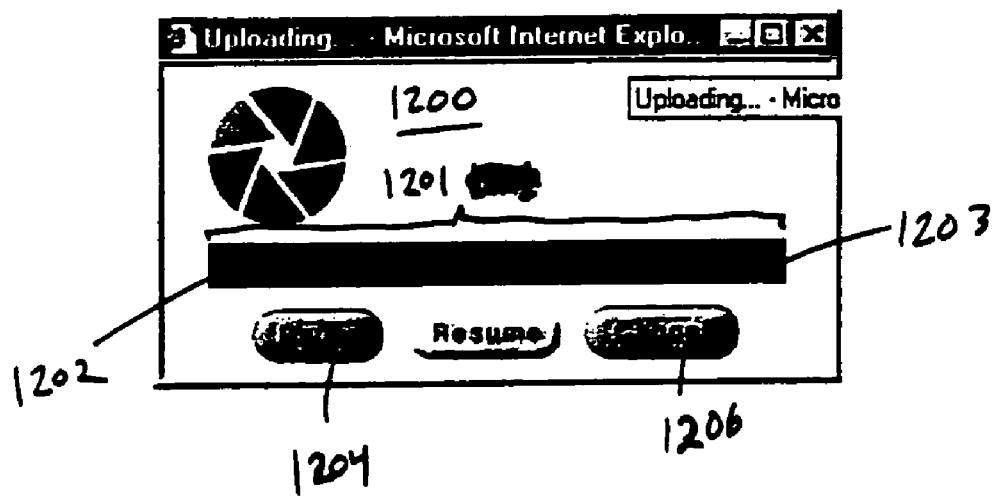
FIG. 12 is a screenshot showing an example of an image upload status window.
Figure 13:
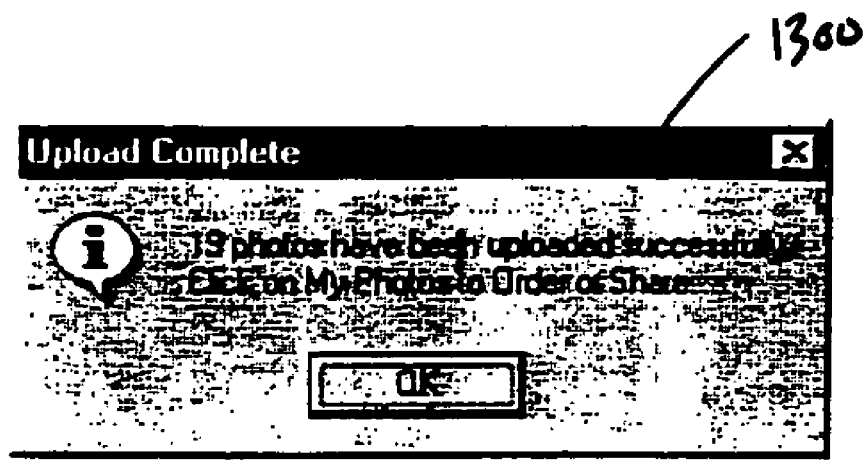
FIG. 13 is a screenshot showing an example of an Upload Complete window.

FIG. 12 shows an image upload status window 1200 which indicates the status of an upload in progress. The relative progress of the upload is designated by a status bar 1201 having a length corresponding to the total amount of data to be uploaded. The light portion 1202 of the status bar 1201 indicates the relative portion of the total amount of data that has been successfully uploaded. The dark portion 1203 of the status bar 1201 indicates the relative portion of the total amount of data that remains to be uploaded. The user can Pause or Cancel the upload sequence by clicking buttons 1204 or 1206, respectively. FIG. 13 shows an Upload Complete pop-up 1300 that is displayed on the user's client computer system when the upload has completed.

Figure 14:
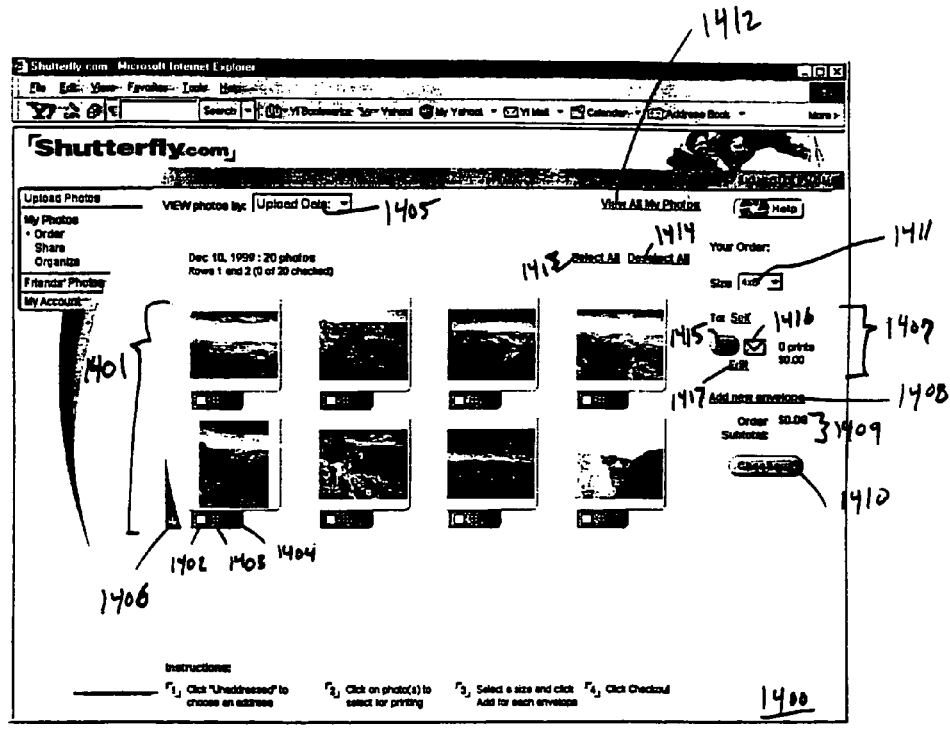
FIGS. 14-15 are screenshots showing examples of a user's photo page.

FIG. 14 shows the user's "My Photos" page 1400 with thumbnails 1401 of eight of the user's images that have been uploaded successfully. The particular thumbnails displayed typically correspond to the most recently uploaded images. The user can view other previously uploaded images either by choosing a different Upload Date from the drop-down list 1405 or by clicking a scrolling control such as the downward arrow 1406.

Each thumbnail 1401 has three associated controls: a checkbox 1402, a detail control 1403 and a rotate control 1404. Clicking the detail control 1403 causes a larger resolution version of the corresponding image to be displayed along with other information pertaining to the image (discussed in more detail below). The checkbox 1402 can be checked selectively by the user to specify whether or not the image under consideration is to be the subject of a print order (discussed further below). The rotate control 1404 serves the same purpose as the rotate control 1005 shown in FIG. 11—namely, to change the orientation of the thumbnail (and the corresponding image) in 90-degree increments. In addition, links are made available to the user to view all of the user's photos 1412, select all of the photos in the current view 1413, or deselect all of the photos in the current view 1414.

The user can order prints of selected images for him/herself and/or for others by selecting the desired images and then associating them with one or more "envelopes." An envelope is a virtual storage entity for holding images that are to be printed and delivered to a single destination. By default, the user's "My Photos" page 1400 includes a single envelope—Self 1407—corresponding to a destination associated with the user. As indicated, the user's Self envelope 1407 currently has zero prints in it. The user can add prints to his/her envelope by selecting the desired image or images (e.g., clicking a thumbnail 1401 or a checkbox 1402) and then clicking the Add button 1415 (or, equivalently, the envelope icon 1416). Each additional click of the Add button 1415 will add another copy of prints of the selected images to the user's Self envelope 1407 (e.g., clicking the Add button 1415 twice will result in ordering two copies of each of the selected images). The size of the ordered prints (e.g., 4×6, 5×7, 8×10, or custom size) can be selected by the user via the Size drop-down list 1411. The user can edit the contents of the Self envelope 1407 (e.g., the number and size of the prints ordered) by clicking the Edit link 1417 (discussed in more detail below).

Figure 15:
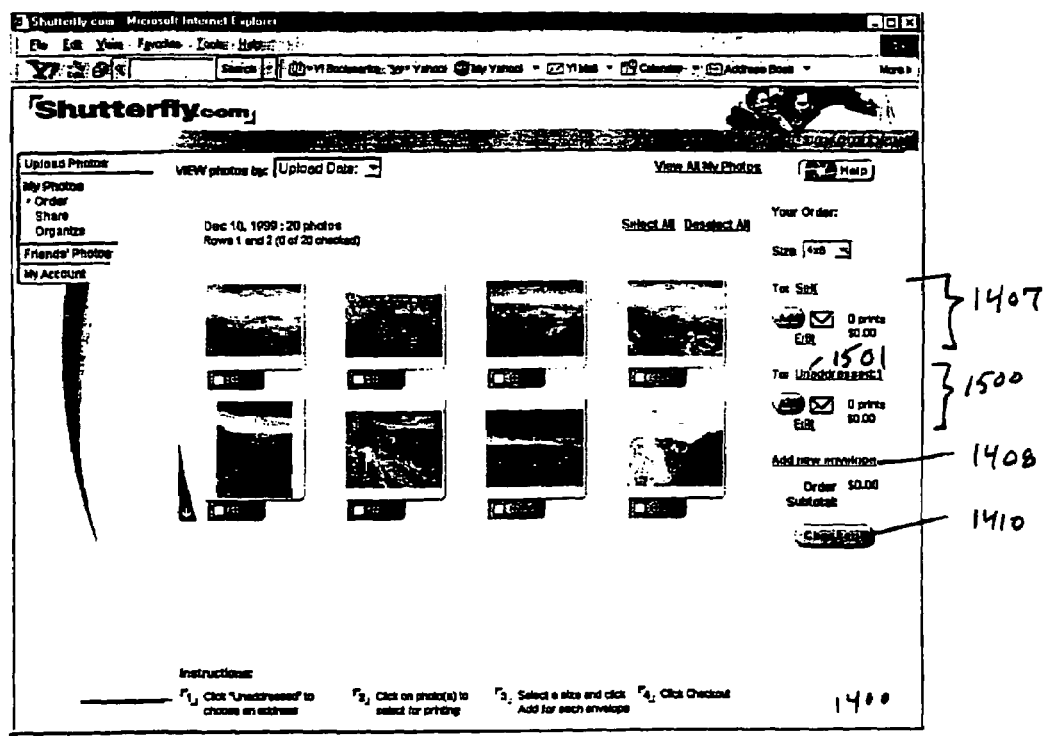
Figure 16:
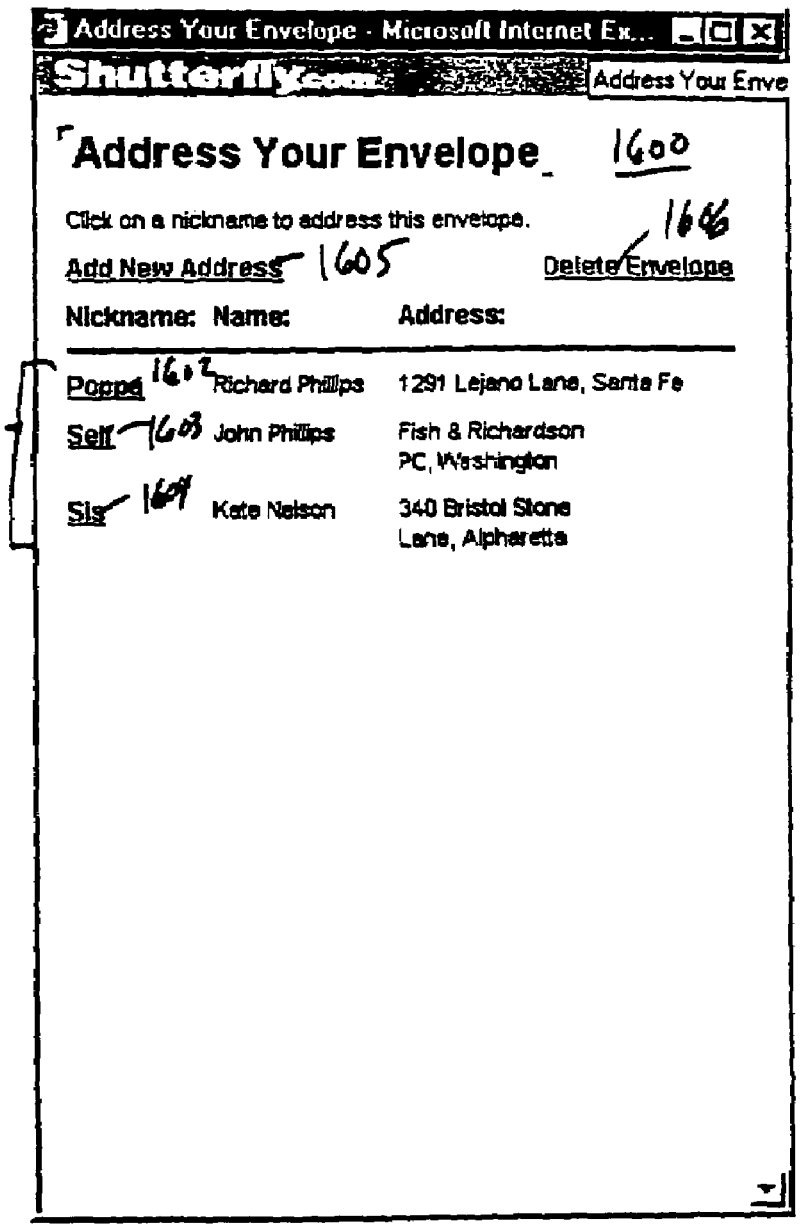
FIG. 16 is a screenshot showing an example of an envelope-addressing window.

The user also can add another envelope to the My Photos page 1400 by clicking the Add new envelope link 1408. Upon doing so, as shown in FIG. 15, the My Photos page 1400 changes appearance by adding another envelope 1500, which at this point has not yet been addressed to any particular recipient. The user addresses the unaddressed envelope 1500 by clicking on the Unaddressed1 link 1501, which causes the Address Your Envelope window 1600 to appear as shown in FIG. 16.

The Address Your Envelope window 1600 includes all of the potential recipients currently in the user's Address Book. The user can address the currently Unaddressed envelope 1500 by clicking on a desired on of the Nickname links 1602-1604, or the user can opt to add a new address to the Address Book by clicking the Add New Address link 1605. If the user decides not to add this new envelope after all, the unaddressed envelope 1500 can be deleted by clicking the Delete Envelope link 1606.

Figure 17:
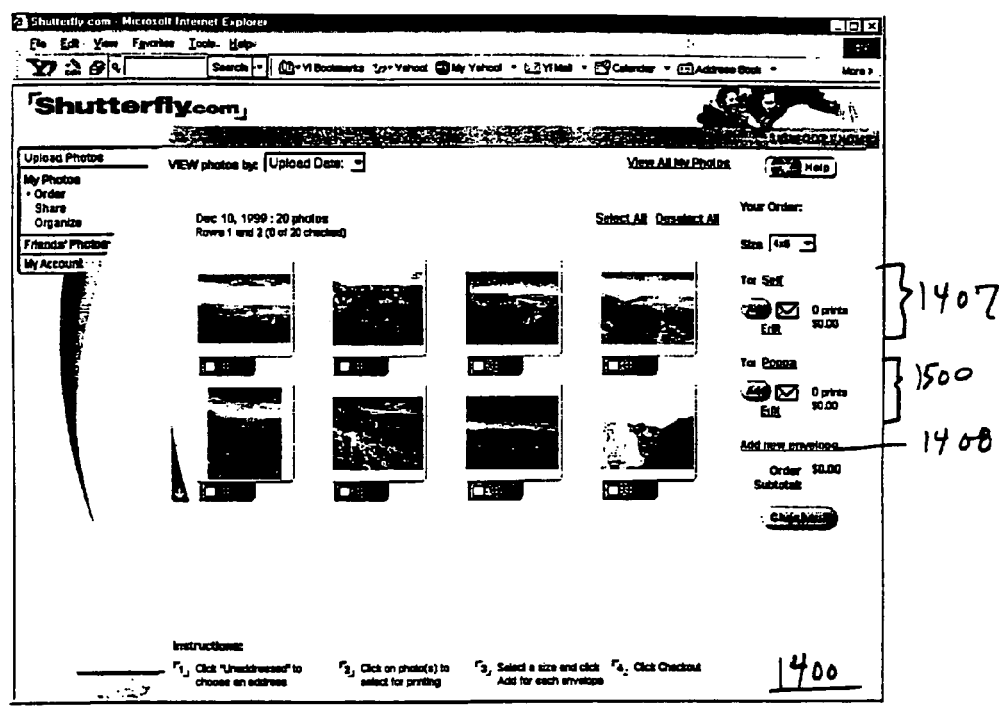
FIGS. 17-18 are screenshots showing examples of a user's photo page.

In this example, the user chooses to address the Unaddressed envelope 1500 to his father by clicking the Poppa link 1602. In response, the Address Your Envelope window 1600 is closed and the My Photos page is updated to change the name of envelope 1500 from "Unaddressed1" to "Poppa," as shown in FIG. 17. The user can now order image prints by selecting the desired images and clicking either the Self envelope 1407 or the Poppa envelope 1500 or both. In addition, different images or sets of images can be added to each enveloped individually as desired. Moreover, each image in each envelope potentially can have different print parameters (e.g., size, finish, number of copies) specified by the user. In this manner, the My Photos page 1400 shown in FIG. 17 allows the user to designate multiple recipients through a single interface screen (e.g., page 1400) and/or within the context of a single order (e.g., as delimited by a checkout sequence). As a result, the efficiency and ease with which image prints can be ordered and delivered to multiple recipients are enhanced dramatically.

Figure 18:
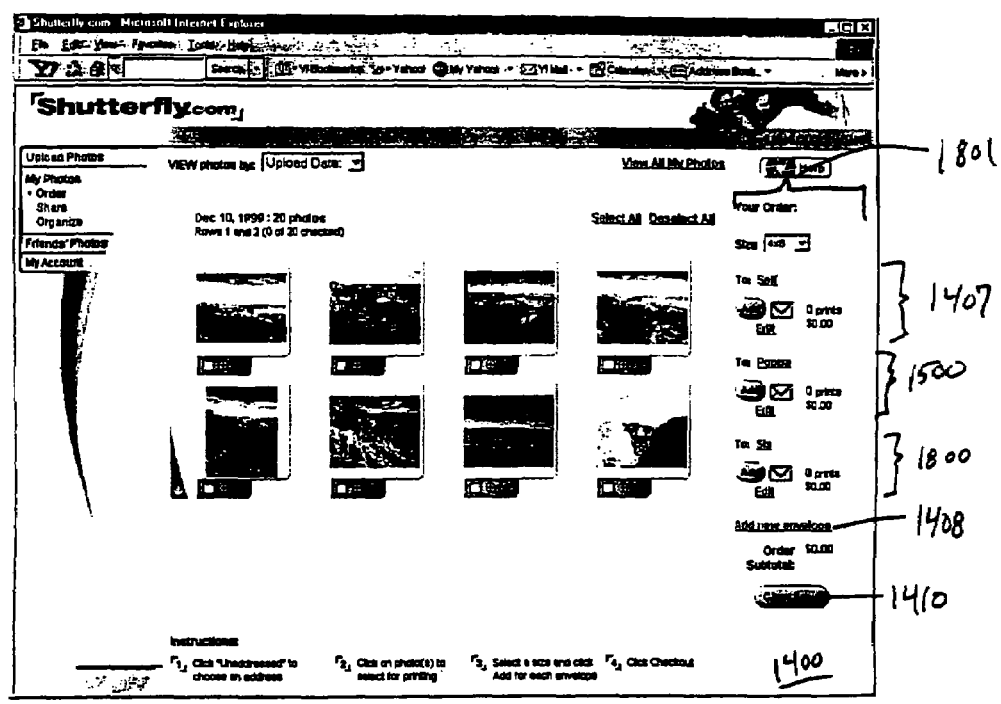

As shown in FIG. 18, additional envelopes such as the Sis envelope 1800 can be added to the My Photos page 1400 as desired by the user in the manner described above. The My Photos page 1400 can support virtually any number of simultaneously available envelopes. If the number of envelopes exceeds the available display area in the browser window 40, a scroll bar (not shown) appears in the Your Order region 1801 to enable the user to scroll through and thus gain access to the available envelopes as desired. As the user adds images to one or more envelopes, the user's My Photos page 1400 maintains and displays a running subtotal of the cost of the order at text region 1409. After completing the order, the user can checkout (e.g., confirm and pay for the order) by clicking the Checkout button 1410 (discussed further below).

Figure 19:
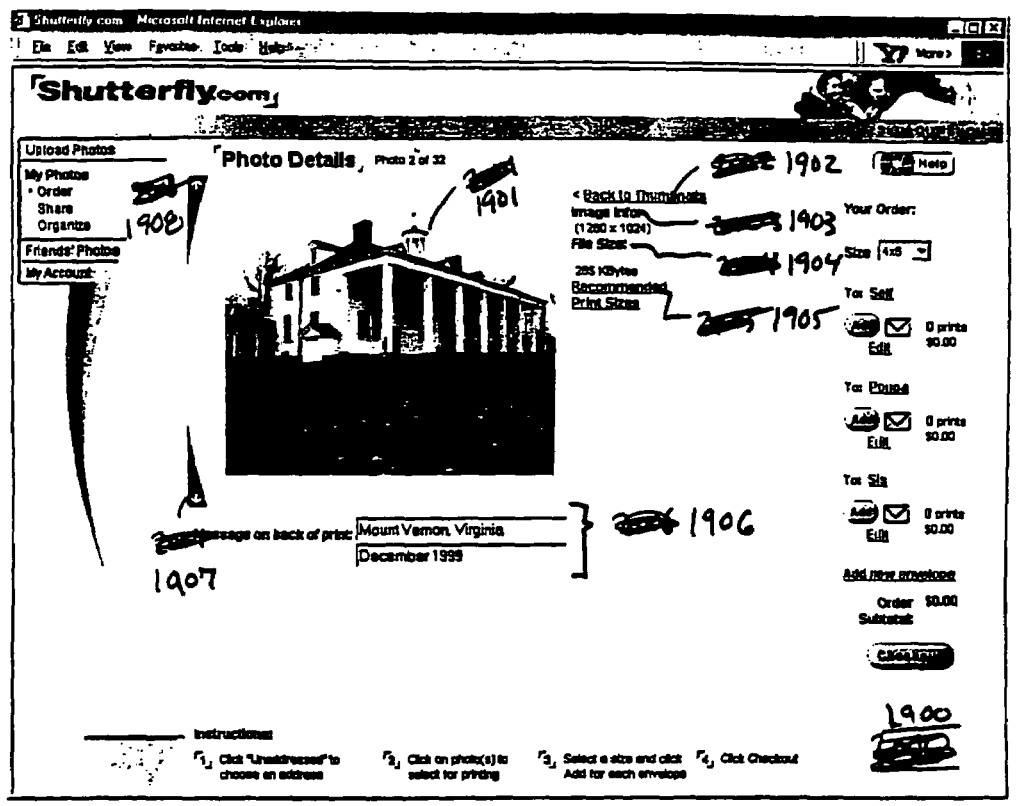
FIG. 19 is a screenshot showing an example of a Photo Details page.

FIG. 19 shows an example of a Photo Details page 1900, which is presented when, for example, the user clicks the image detail control 1403 shown in FIG. 14. As illustrated in FIG. 19, the Photo Details page 1900 includes a larger resolution thumbnail 1901 of the corresponding image along with information describing the full image's resolution 1903, the image File Size 1904, and information about Recommended Print Sizes 1905 for the image under consideration. In addition, the Photo Details page 1900 includes text fields 1906 which allow the user to enter text that will be printed on the back of the image print. Further details describing printing on an image's back are provided in U.S. patent application Ser. No. 09/450,899, filed Nov. 29, 1999, which is incorporated herein by reference. The user can return to the smaller thumbnails (on the My Photos page) by clicking the Back to Thumbnails link 1902 or can view the details of other photos in the same upload group by clicking on the scrolling controls 1907 or 1908 as desired.

Figure 20:
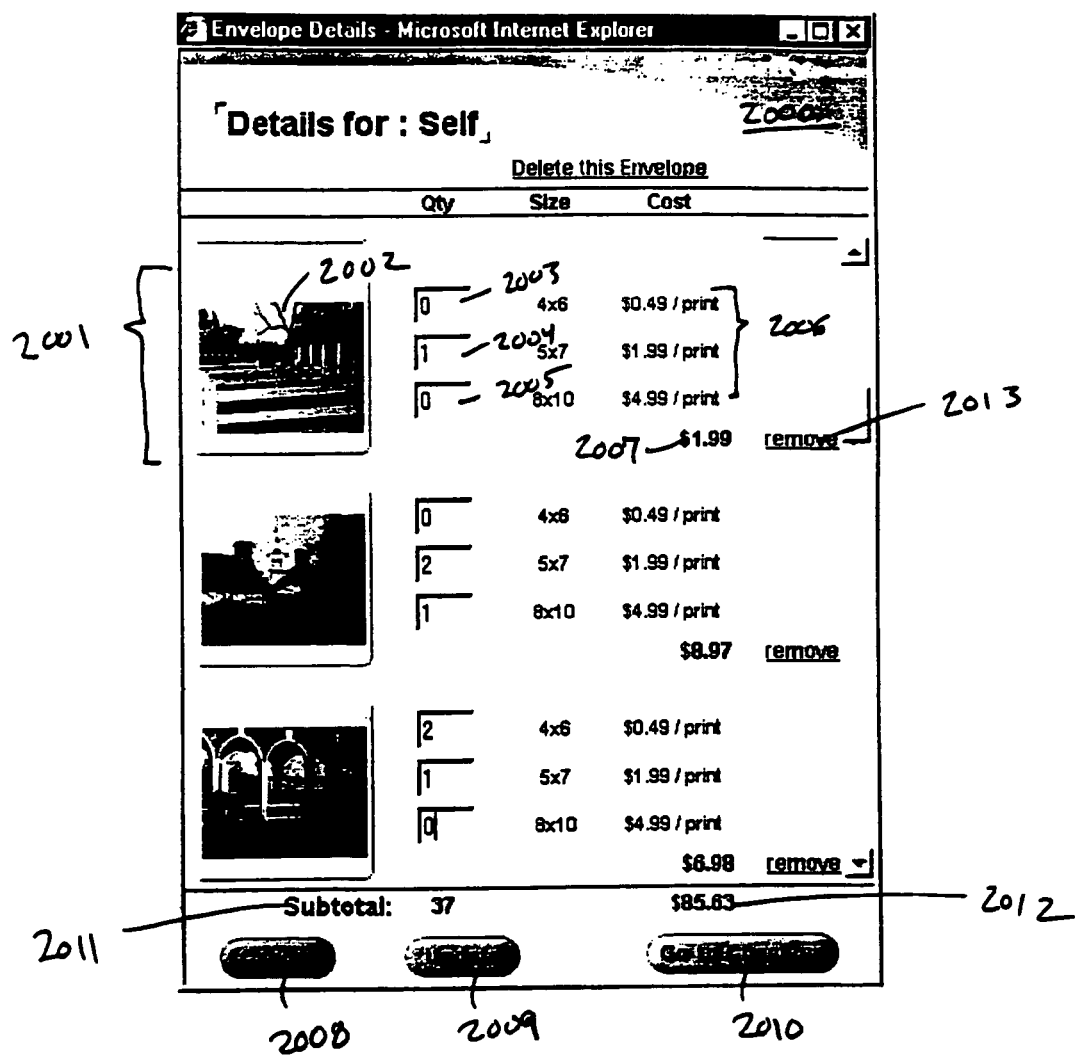
FIG. 20 is a screenshot showing an example of an Envelope Details page.

FIG. 20 shows an Envelope Details window 2000 showing the details of the user's Self envelope. Each image in the envelope has an associated region that includes a thumbnail of the image along with print parameter and cost information. For example, region 2001 includes a thumbnail 2002 and a user-modifiable quantity field 2003-2005 for each different print size (4×6, 5×7, 8×10). The user can modify the number of copies to be ordered of each different print size for the image under consideration by typing in a desired number into the corresponding quantity text field 2003-2005. Alternatively, the user can remove the image from the envelope (equivalently, set all of the quantity fields to zero) by clicking the remove link 2013. Region 2001 also includes cost information associated with the order for that image both on a per size basis 2006 and the subtotal 2007 for all print sizes. The total number of images in the envelope is displayed at Subtotal 2011 and the total cost for all prints in the envelope is displayed at area 2012. After reviewing and/or modifying the envelope details for each separate image in the envelope, the user can either cancel 2008 or update 2009 the envelope by clicking the corresponding buttons, or the user can Go to Checkout by clicking button 2010.

Figure 21:
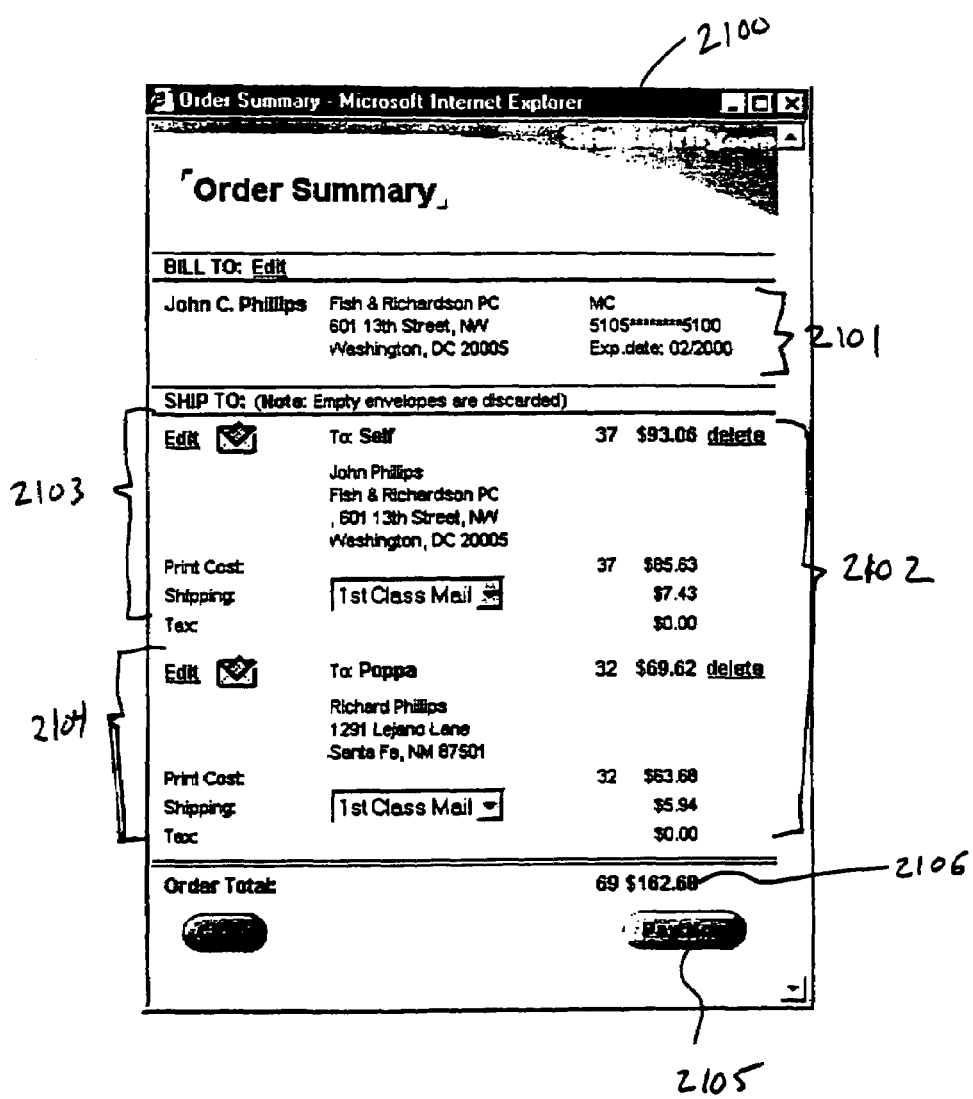
FIG. 21 is a screenshot showing an example of an Order Summary page.

FIG. 21 shows the Order Summary window 2100, which appears when the user clicks the checkout button in one of the other pages as described above. The Order Summary window 2100 includes several items of information including BILL TO information 2101 and SHIP TO information 2102. The SHIP TO information 2102 is broken out by each of the separate recipients in the order who are to receive image prints as specified by the user. In this example, the order includes two different recipients—Self 2103 and Poppa 2104. For each recipient, the shipping address, shipping method and print cost (both a subtotal for the recipient and the cost associated with each different print size) are provided. The Order Summary window 2100 also provides an Order Total cost 2106 and a Pay Now button 2105, which when clicked, finalizes the order.

Figure 23:
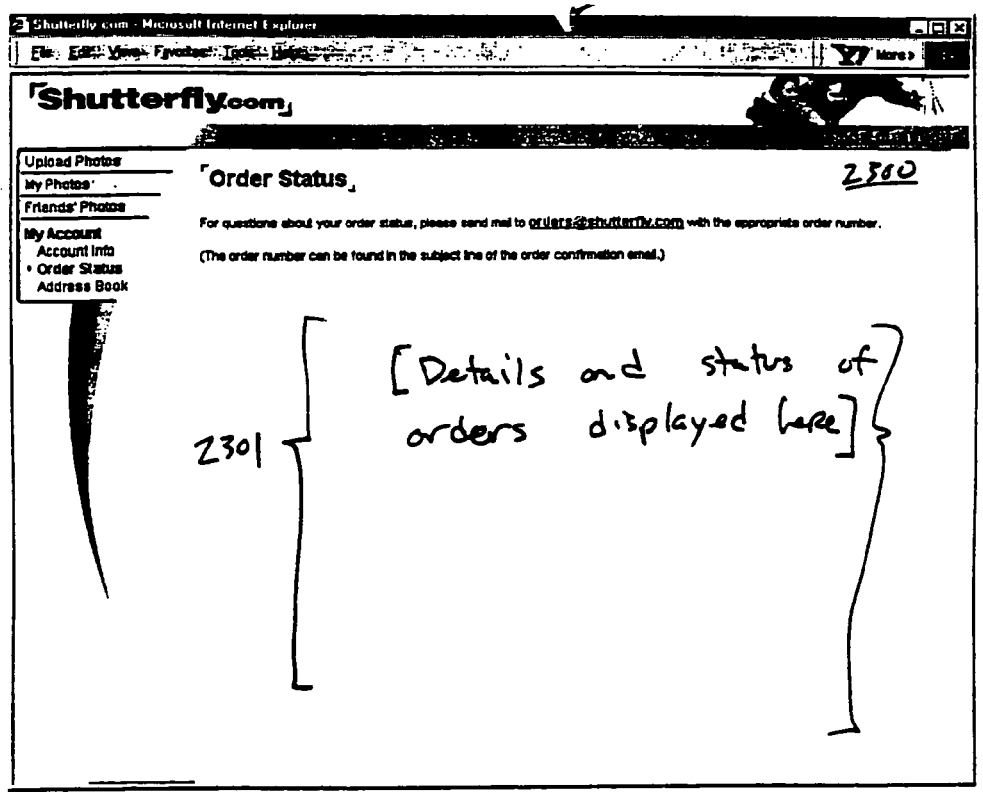
FIG. 23 is a screenshot showing an example of an Order Status page.

Upon receiving an order, the print service's host computer system automatically generates and sends an order confirmation e-mail message such as that shown in FIG. 22. In addition, the user subsequently is sent an "order shipped" e-mail message (not shown) when the order has actually been placed into the shipping channel. Optionally, the order confirmation e-mail message, and/or the order shipped e-mail message, may include a link (not shown) that, when clicked, points the user's browser to a Order Status page 2300 such as shown in FIG. 23, to allow the user to check on the status (not-yet-shipped, shipped, cancelled, complete, etc.) of his/her orders. Such status details could be displayed in region 2301 in the Order Status page 2300.

Figure 24:
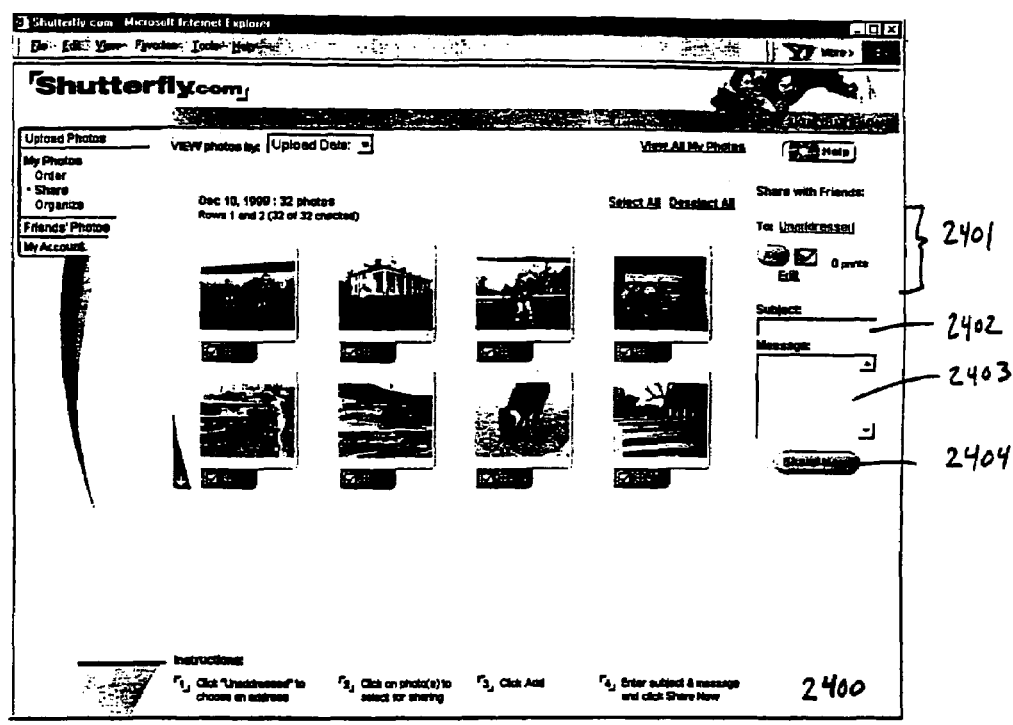
FIGS. 24-25 are screenshots showing examples of pages for sharing photos with other users.
Figure 25:
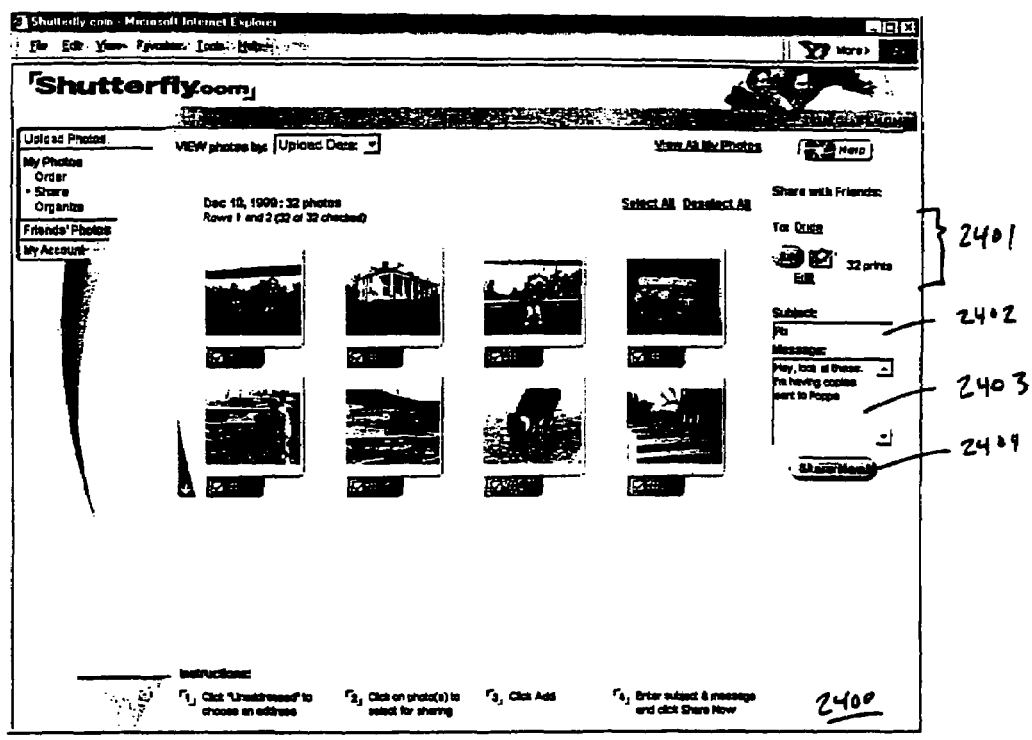

As shown in FIGS. 24 and 25, a user optionally can share his/her online photos (i.e., those images that the user has uploaded to the host computer system) with other users (e.g., friends, family, colleagues, etc.) in order to make a personalized collection of photos available to each of the other users. To do so, the user accesses the Share Photos page 2400 and addresses the Unaddressed envelope 2401 in the manner described above. The Share Photos envelope 2401 differs, however, from the envelopes presented in the My Photos page. Specifically, the Share Photos envelope 2401 does not hold images that are to be printed and delivered to one or more recipients; rather, the Share Photos envelope 2401 hold images that are to be made accessible online to the specified share recipient. That recipient, however, can then order prints of the shared images if desired.

Figure 26:
FIG. 26 is a screenshot showing an example of a Share Confirmation window.

After addressing the Share Photos envelope 2401, the user optionally can specify a subject line 2402 and/or a message 2403 that will be sent in an automatically generated e-mail message (not shown) to the intended share recipient, along with information (URL, Sign In name, password, etc.) for accessing the shared images. The user completes the photo-sharing sequence by clicking the Share Now button 2404, which results in the above-noted photo-sharing e-mail message to be generated and sent, and causes the host system to set access permissions as appropriate to allow the intended share recipient to access the online images specified by the user. The host system confirms successful completion of the photo-sharing sequence by displaying a Share Confirmed pop-up window 2600, as shown in FIG. 26.

Figure 27:
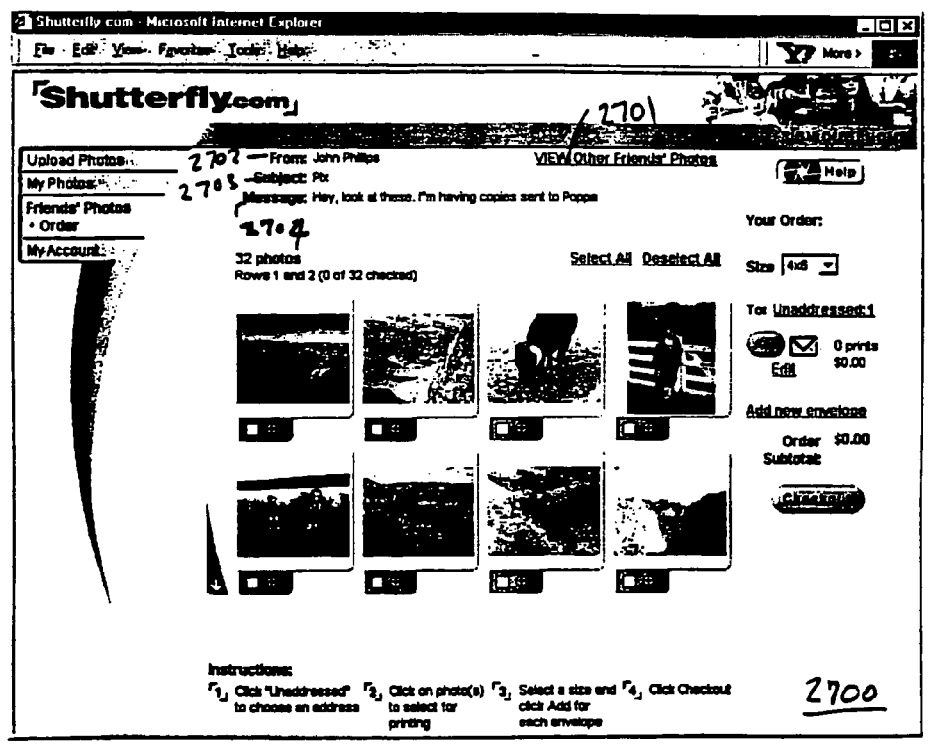
FIGS. 27-29 are screenshots showing examples of pages by which a user can view others' photos.

The user can view online photos that others have shared with him/her by accessing the Friends' Photos page 2700 shown in FIG. 27. The Friends' Photos page 2700 includes various items of information to identify the friend 2702 who shared these images, along with the Subject 2703 and Message 2704 specified by that friend. The functionality provided by the Friends' Photos page 2700 essentially is the same as the My Photos page. That is, the Friends' Photos page 2700 enables the user to select images and order copies of them for one or more recipients, each having a separate envelope, in the manners described above.

Figure 28:
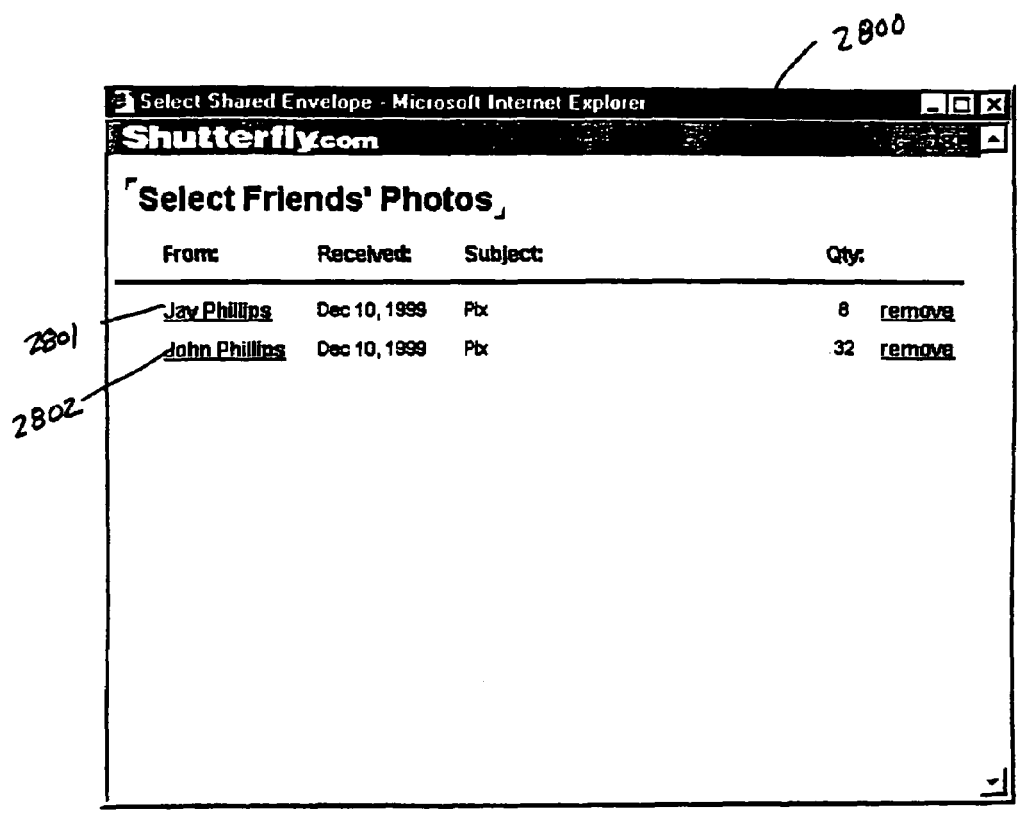
Figure 29:
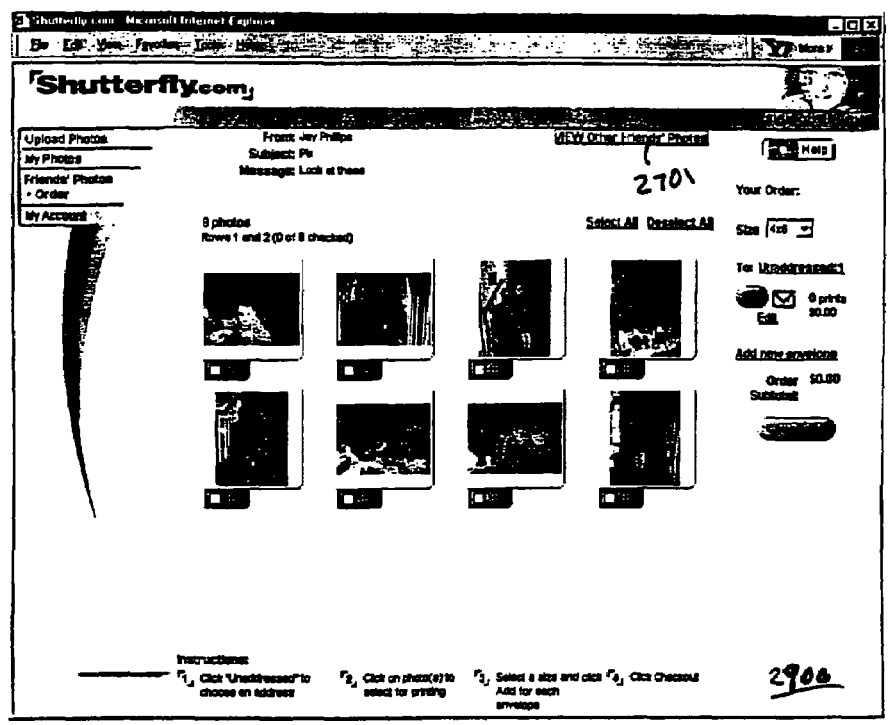

If more than one friend has shared photos with the user, the user can switch between different Friends' Photos pages by clicking the VIEW Other Friends' Photos link 2701, which brings up the Select Friends' Photos window 2800 shown in FIG. 28. In this example, two different friends 2801 and 2802 have shared photos with this user. If the user clicks on the link 2801, a different friend's photos are displayed in another Friends' Photos page 2900, as shown in FIG. 29.

Figure 30:
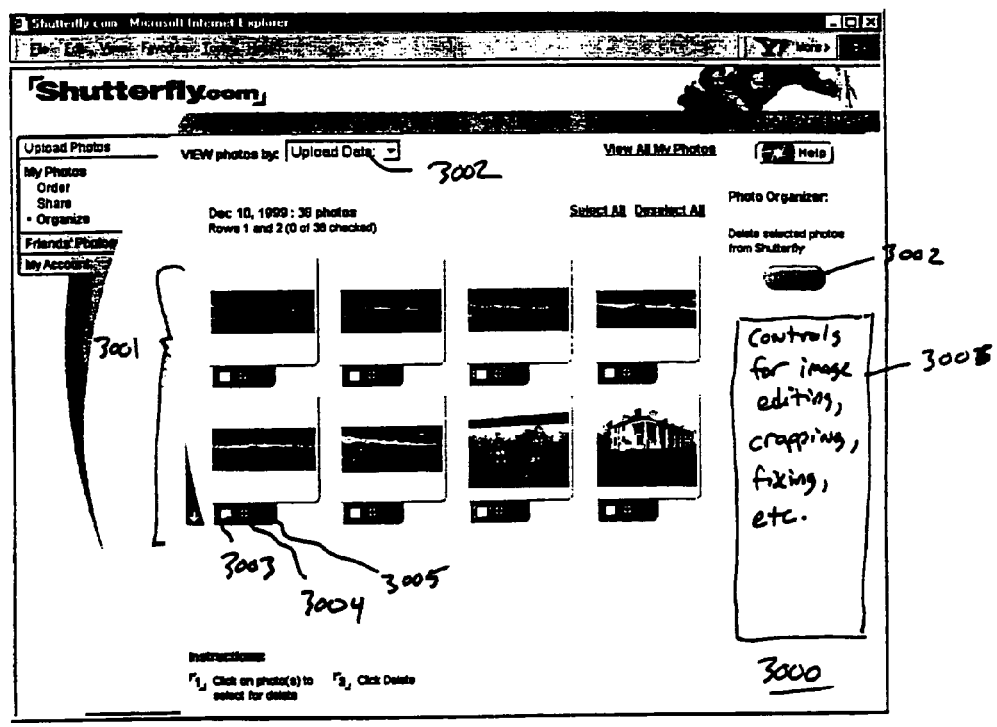
FIG. 30 is a screenshot showing an example of a page for organizing a user's photos.

FIG. 30 shows an Organize page 3000 through which a user can perform various management operations on his/her uploaded images 3001. For example, in the example shown, the user can delete any of the uploaded images 3001 for a specific upload date 3002 by clicking a checkbox 3003 and then clicking the Delete button 3002. In addition, the user can inspect image details or rotate and image by manipulating controls 3004 and 3005, respectively, in the manners described above. Other controls 3006 could be provided on the Organize page 3000 to enable the user, for example, to edit images, crop images, perform various image enhancement or fixing operations, etc. In one implementation, interface controls and options could be provided to allow the user to sort his/her images by keyword or category or both. For example, the user could associate a keyword—e.g., his child's name, Jacob—with any or all of the user's images of Jacob. Then, the user could subsequently retrieve all images of Jacob by doing a keyword search for "Jacob". Similarly, the user could associate selected photos taken on various trips by the user with an appropriate category—e.g., Travel—and then later find all such Travel pictures by doing an appropriate category search. In general, the available keywords and/or categories either could be predefined by the print service, or could be edited or created by the user, or both.

Aspects of the embodiment described above may provide one or more of the following advantages. The systems and techniques described here provide intuitive and convenient mechanisms that allow a user to order prints of images and have the prints distributed to multiple recipients at different locations with a minimum of time, trouble and expense on the part of the ordering user. For example, in a single ordering sequence, a user can specify a set of one or more prints and have them distributed to multiple different recipients. As a result, the user need not reenter redundant information—for example, identifying the images to be printed, supplying payment information, and the like—as otherwise would be required if the print order was limited to a single shipping destination. Moreover, by allowing a user to specify multiple recipients within a single print order, the user is not subjected to a minimum dollar amount for each of several different orders. Rather, because multiple recipients are allowed, the user is better able to satisfy the minimum dollar amount without being forced to order more prints than otherwise would be desired.

In addition, because an order can designate multiple recipients, the user need not incur multiple charges on a credit card or other financial instrument when ordering prints for multiple recipients. Furthermore, by allowing the user to specify different print parameters (e.g., size, number of copies, finish) for each of the individual recipients, flexibility and convenience in the print ordering process are enhanced.

Moreover, users can distribute copies of prints to multiple recipients without having to incur the effort and expense involved in receiving print copies from a photofinisher, sorting the prints into sets according to destinations, putting the prints in protective envelopes, and then re-mailing the sets of prints to their respective recipients. As a result, sets of prints can be distributed to multiple destinations more quickly and with less expense and effort.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer 108 as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components.

What is claimed is:

1. A method for designating multiple recipients for an image at an on-line print service, the method comprising:
   creating a plurality of envelopes and displaying each envelope on a user interface;
   associating with each envelope an intended recipient to receive images placed in a respective envelope;
   displaying on the user interface one or more digital images along with the plural envelopes;
   selecting a digital image for distribution to multiple recipients;
   associating a selected digital image with two or more envelopes; and
   providing an order details button for the one or more envelopes, the order details button operable to display, when invoked, an envelope summary including a thumbnail representation of each digital image selected for an image print, an image print size, and an image print quantity.

2. The method of claim 1 further comprising displaying along with each envelope an identifier associated with the name of a recipient.

3. The method of claim 2 further comprising displaying along with each envelope a running price associated with the total price of images placed in a respective envelope.

4. The method of claim 1 further comprising displaying a checkbox with each image, the checkbox for designating an image to be included in an order.

5. The method of claim 1 wherein the step of associating an image includes placing an instance of the image in each envelope associated with an intended recipient.

6. The method of claim 1 further comprising an add button or link associated with each envelope, the add button, when invoked, operable to add a copy of each selected image to a respective envelope.

7. The method of claim 6 wherein the step of associating includes selecting an add button or link associated with an envelope of an intended recipient.

8. The method of claim 1 further comprising displaying price and quantity data associated with each envelope, the price data indicative of a price for processing an envelope including the images specified by the user for the intended recipient, and the quantity data including a count of a number of images included in the respective envelope.

9. The method of claim 8 further comprising updating the price and the quantity data for a given envelope each time a new image is associated with a given envelope.

10. The method of claim 1 further comprising displaying an order total indicative of the price for processing all of the envelopes presented on the user interface.

11. The method of claim 1 further including displaying on the user interface an order details button for each envelope, the order details button operable to display, when invoked, a envelope summary, the envelope summary including a representation of each image selected and a size and quantity data for each image, the size data indicative of the size of the image print to be printed and the quantity data indicative of the number of prints of a given size to be included in a given order.

12. The method of claim 11 wherein the envelope summary includes a message to be printed on the print.

13. The method of claim 11 wherein the envelope summary includes a preview of the print including as ordered including any user designated effects.

14. The method of claim 11 further comprising changing an order for an intended recipient when reviewing the envelope summary and automatically recalculating the price and quantity data displayed on the user interface for an associated envelope.

15. The method of claim 1 further comprising including an order button on the user interface along with the envelopes and image selections, the order button operable, when selected, to place an order in accordance with the envelopes specified on the user interface for plural recipients from a single user interface page.

16. The method of claim 15 further comprising displaying a order summary in a single summary user interface for plural recipients, the order summary including plural entries, one for each envelope specified in the user interface.

17. The method of claim 16 further comprising displaying shipping information, shipping selections and shipping price for each intended recipient, the method including receiving shipping selections for each recipient and updating a total cost for each intended recipient's order including the selected shipping preference.

18. The method of claim 16 further comprising displaying quantity data and price data on the order summary for each envelope.

19. The method of claim 16 further comprising displaying a pay now button, that when invoked, is operable to process all of the envelopes specified in the order summary.

20. The method of claim 19 further comprising processing all of the envelopes as specified in the order summary as a single order.

21. The method of claim 1 further comprising
processing all of the envelopes as a single order; and
sending an email confirmation to user describing the order commitment with the processing step.

22. The method of claim 21 wherein the email confirmation includes a summary of each envelope.

23. The method of claim 1 further comprising
processing all of the envelopes in a single order; and
displaying a status of the order when prompted by the user through the on-line print service.

24. The method of claim 1 further comprising
processing all of the envelopes in a single order;
aggregating summary information for each envelope on a single user interface page accessible by the user through the on-line print service.

25. A method for sharing images among multiple recipients using an on-line print service, the method comprising:
creating a plurality of envelopes and displaying each envelope on a user interface;
associating with each envelope an intended recipient for sharing digital images designated by a respective envelope;
displaying on the user interface one or more digital images along with the plural envelopes;
selecting a digital image for sharing with multiple recipients;
associating a selected digital image with two or more envelopes; and
providing an order details button for the one or more envelopes, the order details button operable to display, when invoked, an envelope summary including a thumbnail representation of each digital image selected for an image print, an image print size, and an image print quantity.

26. The method of claim 25 further comprising making each image in an envelope accessible at the on-line print service to an intended recipient.

27. The method of claim 25 further comprising
in the user interface, displaying a field for designating a message to be associated with a shared image;
associating a received message with a respective shared image; and
distributing the message with the respective image in accordance with distribution instructions embodied in the respective envelopes.

28. The method of claim 27 further comprising
displaying a field for designating a subject to be associated with a shared image;
associating a received subject with a respective shared image; and
distributing the subject with the respective image in accordance with distribution instructions embodied in the respective envelopes.

29. The method of claim 25 further comprising
processing the shared order including
notifying an intended recipient of shared images, and
allowing an intended recipient to view shared images.

30. The method of claim 29 wherein the step of notifying includes distributing an email to an intended recipient indicating that images are available to be shared.

31. The method of claim 29 wherein the step of notifying includes notifying the intended recipient a next time the intended recipient logs in to the on-line print service.

32. The method of claim 31 wherein the step of notifying includes displaying a customized user account page to a user upon login that includes a shared status indicator for indicating that images are available to be shared.

33. The method of claim 32 wherein the shared status indicator is a link to a shared image user interface, the method including displaying the shared images on the shared image user interface.

34. The method of claim 33 further comprising
receiving an order for printing one or more of the shared images; and
processing the order.

* * * * *